(12) United States Patent
Goiffon et al.

(10) Patent No.: US 6,453,312 B1
(45) Date of Patent: Sep. 17, 2002

(54) SYSTEM AND METHOD FOR DEVELOPING A SELECTABLY-EXPANDABLE CONCEPT-BASED SEARCH

(75) Inventors: David A. Goiffon, Shoreview; David R. Johnson, Oakdale; Gerald E. Hartmann, Minneapolis, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/172,423

(22) Filed: Oct. 14, 1998

(51) Int. Cl.[7] .............................................. G06F 17/30
(52) U.S. Cl. .................... 707/3; 707/4; 707/5; 345/853
(58) Field of Search ....................... 707/3, 4, 5; 345/32, 345/33, 34, 35, 711; 711/445

(56) References Cited

U.S. PATENT DOCUMENTS

| | | | | |
|---|---|---|---|---|
| 5,278,980 A | * | 1/1994 | Pedersen et al. ................ | 707/4 |
| 5,369,577 A | | 11/1994 | Kadashevich ................... | 704/9 |
| 5,553,226 A | * | 9/1996 | Kiuchi et al. ................... | 345/356 |
| 5,555,408 A | | 9/1996 | Fujisawa et al. ................ | 707/5 |
| 5,600,831 A | * | 2/1997 | Levy et al. ..................... | 707/2 |
| 5,644,740 A | * | 7/1997 | Kiuchi ........................ | 345/357 |
| 5,696,916 A | * | 12/1997 | Yamazaki et al. ........... | 345/356 |
| 5,940,821 A | * | 8/1999 | Wical ............................. | 707/3 |
| 5,953,718 A | * | 9/1999 | Wical ............................. | 707/5 |
| 6,038,560 A | * | 3/2000 | Wical ............................. | 707/5 |
| 6,226,792 B1 | * | 5/2001 | Goiffon et al. ................ | 717/11 |

* cited by examiner

Primary Examiner—Jean M. Corrielus
Assistant Examiner—Jean Bolte Fleurantin
(74) Attorney, Agent, or Firm—Beth L. McMahon; Michael B. Atlass; Charles A. Johnson

(57) ABSTRACT

A computer-implemented system and method for allowing users to interactively develop search queries is provided. The system performs query development utilizing a hierarchical concept tree stored in memory, wherein the nodes of the concept tree are concepts that describe various search topics. Parent/child relationships are created between the concepts, with children concepts describing sub-categories of a parent concept, and so on. Any concept at any level in the tree structure may be related to one or more character strings descriptive of the related concept. Query development is performed by traversing the various relationships in the hierarchical tree structure to selectively add related character strings to a potential query. According to one embodiment, the user is allowed to control the manner and extent of the traversal, and is further allowed to de-select any located concepts and character strings for further use in query development. According to another embodiment, traversal of the tree is completed according to user specification, with only limited user intervention required to select or de-select the various located character strings for inclusion in a query string. Yet another embodiment allows all query string development to be fully automated based on parameters specifying the extent of the concept tree traversal. After traversal of the tree structure is completed, the located character strings that remain selected based on user specifications are added to a query string. The query string may further be modified to include logical operations. The string may be used to manually or programmatically invoke a wide variety of tools for use in performing searches of text documents, file systems, or a collection of web pages. The system allows the contents and structure of the hierarchical concept tree to be modified by the user. Both the concepts and character strings included in the hierarchical tree may be edited by the user to include search terms tailored to specific search requirements. Additionally, relationships existing between two concepts, or between a concept and a character string, may be added, deleted, or modified to thereby allow the user to control the manner in which query development proceeds.

37 Claims, 18 Drawing Sheets

*Relationship View*

*Affinity View*

| CONCEPTS | WORDS/WORD VARIANTS | | |
|---|---|---|---|
| MOTOR VEHICLES<br>  CAR<br>  VOLKSWAGON<br>    VW BEETLE<br><br>    VW VAN<br>  FORD<br>    MUSTANG<br><br>  VAN  VW VAN | CAR<br>VOLKSWAGON<br>BUG (NOUN)  BUGS, BUG'S<br>BEETLE    BEETLES, BEETLE'S<br>VW VAN<br><br>VW VAN | | |

[ENTER] — 1210

SYSTEM AND METHOD FOR DEVELOPING A SELECTABLY-EXPANDABLE CONCEPT-BASED SEARCH

CROSS-REFERENCES

This patent application is further related to the co-pending U.S. patent application Ser. No. 09/173,095, now U.S. Pat. No. 6,226,792 entitled, "An Object Management System Supporting the Use of Application Domain Knowledge Mapped to Technology Domain Knowledge", filed Oct. 14, 1998 concurrently herewith by Goiffon et al., which is assigned to the assignee of the present invention, and incorporated herein by reference in its entirety.

BACKGROUND OF THE INVENTION

1. Field of the Invention

This invention relates generally to an improved system and method for aiding users in the development of a query string; and more specifically, to a system and method for allowing a user to control the development of a concept-based natural language search query by controlling the manner in which a hierarchical concept tree is structured and traversed.

2. Description of the Prior Art

Today's data processing systems are capable of storing large volumes of data. The density of storage devices continue to increase at the same time the prices for such devices are falling. In addition, current networking capabilities allow multiple storage devices and file servers to be interconnected so that databases can be shared across systems. As a result, users of current computer systems are provided with access to an unprecedented amount of information.

The internet is a prime example of this information explosion. It is estimated that between 30 and 50 million pages are currently available to users of the internet. In addition to this publicly-available documentation, many users are also provided with other proprietary sources of information, such as those that are available via corporate intranet sites. Information may be obtained from still other sources, such as newsgroups.

To take advantage of the large amount of information made available by technological advances, the information must be readily accessible. Users must be able to locate and retrieve the documents that are needed in a timely manner. To do this, information retrieval systems must be developed that allow users to identify the best or most relevant information associated with a user request.

Many challenges exist when developing an information retrieval system that is capable of aiding users in finding meaningful information from a large body of electronic data. Often times, the users of such systems are only familiar with general topics of interest, and are not able to specify the actual terminology used within the textual information that is relevant for a desired topic. Additionally, the user may not be familiar with the keyword descriptors used to index the documents. As a result, the user-provided query may be incomplete or inaccurate. Other factors, for example regional language dialects, may further influence the construction of a search query. For all of these reasons, the information retrieved during a search may only yield a small number of documents that are actually relevant.

One way to improve search results is to provide a mechanism for automatically expanding a user-provided query string to include terms that do not appear in the query, but which may correspond to, or be associated with, the user-provided query terms. A system of this type is disclosed in U.S. Pat. No. 5,265,065 to Turtle. This patent describes a system in which words of a natural language input query are replaced with phrases from a database in a manner that expands the query. The expanded query is then utilized for information retrieval. The problem with many prior art systems of this type is that no opportunity is provided for the user to interactively participate in the query development process. If the search is unsuccessful, the user must simply re-execute the search with a different query string.

One method which does provide an iterative technique for allowing a user to interactively refine a query is provided in U.S. Pat. No. 5,278,980 to Pedersen et al. This patent describes a process whereby a user-provided query is developed into a search string that is further used to locate a list of matched phrases from a corpus of documents. Words from the returned phrases that are not included in the original query can be used to refine the query. This process can be repeated to retrieve documents that are increasingly focused on the desired topic. Although this system provides an opportunity for the user to exert control over the query development, the user intervention is only allowed after a search has been performed. This may waste processing resources, and does not provide any insight into the manner in which the user-provided query is developed into the actual search string.

Other types of search tools have been developed which seek to expand user-provided queries by employing context-based analysis techniques. These search tools analyze a phrase provided by a user in attempt to "understand" the user's intent. The search tools place various search terms within the context of other search terms so that the concept behind the query can be determined. While these types of tools can result in the retrieval of more relevant documents, these tools have the above-mentioned disadvantage of not allowing a user to participate in the search development process. That is, these tools utilize predetermined algorithms that can not be influenced by the user. Once the user provides an initial query string, additional query analysis and development is under the control of the tool, and the user is not provided any ability to control the algorithm or the lexicon employed in increasing the scope of the search. Thus, the number of irrelevant documents retrieved may actually be increased instead of decreased.

Another problem with existing search tools is that the user is not allowed to specify, with any degree of definiteness, the extent to which a query should be expanded. For example, a user may want to specify a given topic like "Mexican Cooking" for document retrieval. The user may further want the same search to return documents on growing peppers. Prior art search engines do not allow the user to exert control over the precise scope of the search so that documents concerning multiple related, yet distinct, topics can be retrieved using the same search.

Yet another drawback associated with prior art tools involves the limited visibility provided into the actual query development process. Because the user is not allowed to view the manner in which search expansion is accomplished, it is difficult to determine how a query string should be revised to retrieve more relevant documentation. If a search is unsuccessful, the user is left to guess as to how the query might be modified to obtain more meaningful results.

Still another problem with current document retrieval systems is that both the lexicon and the algorithm employed to expand a search is fixed. That is, the user is not allowed to modify the content or the arrangement of the index employed to develop a query. Thus, query development can not be customized to account for professional terminology, business or company-specific acronyms, newly-coined expressions, and the like, that may be included in a particular user's corpus of documentation.

What is needed is a flexible search system that allows users to closely control the expansion of a search query. The system should also provide the capability for a user to modify the manner in which particular query expansions. This capability should include the ability to modify both the system lexicon, and the lexicon organization. The system should allow users to add user-specific terminology such as regional jargon, slang terms, foreign language representations, or any other particularized phrases included in the body of material to be searched.

OBJECTS

It is a primary object of the current invention to provide an improved system for aiding users in developing search queries;

It is another object of the invention to provide a system that allows users to interactively control the manner in which a search query is expanded;

It is yet another object of the invention to provide a system wherein an iterative, interactive process is utilized to allow a user to expand a search query while exploring the lexicon of the system;

It is still another object of the invention to provide a system for cataloging search terms in a manner that is controllable by users;

It is yet another object of the invention to provide a system for aiding in the development of search queries, wherein the system has an expandable lexicon that may be modified by the user;

It is still another object of the invention to provide a system for aiding in the development of search queries wherein the scope of search expansion is controlled by the user;

It is another object of the invention to provide a system for aiding in the development of search queries wherein the extent of user interaction is controllable by the user;

It is yet another object of the invention to provide a system for aiding in the development of search queries wherein the extent to which a lexicon is used to expand a query is controlled by the user; and It is yet another object of the invention to utilize an object-oriented repository to implement a hierarchical concept tree for use in interactive query development, and wherein a query developed by the system may be utilized to search other objects stored in the object-oriented repository.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is a computer-implemented system and method for allowing users to interactively develop searches. The system utilizes a hierarchical concept tree stored in memory to develop a query. The nodes of the concept tree, which are grouped according to broad application areas called Application Domains, represent concepts that might describe any given search topic. Relationships are created between the concepts. The relationships, which exist as the branches of the hierarchical concept tree, represent the manner in which the concepts interrelate. A concept may be related to one or more "parent" concepts existing one level higher in the tree structure, or may be related to one or more "child" concepts existing one level lower in the tree structure. Concepts having the same parent are said to be "siblings". The level of generality of the topics stored within the concept tree ranges from most general at the top of the tree structure, to progressively more specific at the lower-levels of the tree structure.

Each concept stored as a node in the tree may be related laterally to one or more other nodes storing character strings, and which may be referred to as "word elements". Each word element may further be related to one or more other nodes storing variants of the stored character string, including abbreviations, acronyms, foreign language translations, plural formats, possessive formats, and the like. These nodes may be referred to as "word variant elements". The word and word variant elements comprise the lexicon of the system, and are used to develop a query.

The system includes a user interface that allows for interactive traversal of the various relationships in the hierarchical tree structure. The word and word variant elements located during this traversal are added to a potential query string. Traversal of the tree structure begins by locating a user-provided character string in one of the word or word variant elements. Traversal of the tree continues so that related concepts are located, and further, so that all other word and word variants related to the located concepts are also located. The user is allowed to select or de-select each of the located concepts, words, or word variants for further inclusion in the query development process. Traversal of the hierarchical tree structure continues with the parents and children of the remaining initially-located concepts. After each additional level in the concept tree is traversed, the user is allowed to again specify selection or de-selection of any of the located concepts, words, or word variants. The user is also allowed to specify whether the search should be expanded to include parents, children, or siblings of a previously-located concept. This allows the user to expand query development to include concepts that would otherwise not be located during traversal of the parents and children of the initially-located concept. This iterative process continues until a selected number of levels in both the parent and child directions have been traversed in the hierarchical tree structure for the initially-located concepts. This query development method allows the user to view search terms as the terms are added to the query, and further allows control over search expansion in a manner which is not provided for in prior art systems. Because the user controls the concepts that will be included in the search query, a single search may include multiple related, yet distinct concepts.

After traversal of the hierarchical tree structure has progressed to the extent specified by the user, the word and word variant strings related to the selected concepts may be formed into a query string that includes logical operators. The query string will be formatted as required by the search tools that will receive the query string. The query string is provided to manually or programmatically invoke any number of various tools used to perform a text or file search. These tools include text editors, web-based search engines, file management systems, or object management systems used to catalog and track the development of software constructs.

According to one embodiment of the invention, the hierarchical tree structure is implemented in an object-oriented repository. The developed query string is used to search other objects stored within the same object-oriented repository.

The current system allows the hierarchical concept tree structure used in query development to be viewed and modified by a user. A user may edit the contents of, and the relationships between, the concepts, words, and word variants. Relationships may be modified by moving any of the concept nodes to a different location in the hierarchical concept tree structure. Similarly, relationships may be modified or created between word variant and word elements, and word elements and concept elements. Alternatively, relationships between nodes may be deleted. This allows the user to closely control the manner in which query development will progress. This capability allows the user to tailor the hierarchical concept tree and the lexicon used in query development to specific needs. For example, the lexicon may be modified to include terms, acronyms, product names, and the like that may be unique to a particular company, profession, or line of business. Regional dialects or personal preferences may also be reflected in the terms included in the tree.

According to one embodiment of the invention, a user is allowed to specify at the outset the number of levels of traversal that should occur within the hierarchical concept tree structure, with user intervention being required only at the termination of tree traversal. The user is then allowed to select or de-select various ones of the strings to be included in the query string, and to add logical operators to the string. This embodiment allows a user familiar with the hierarchical tree structure to develop a query string with only minimal user intervention.

According to yet another embodiment of the invention, query development may be fully automated by programmatically invoking traversal of the hierarchical concept tree structure with the selected parameters. All character strings that are located during traversal of the hierarchical concept tree are automatically formatted into a query string that may further include logical operators added using script commands.

The current invention provides a system and method that allows a user to develop a concept-based search using a concept tree and lexicon that may be closely tailored to user needs. Furthermore the level of user interaction during query development may be selected to meet user requirements, ranging from a high degree of user intervention to no intervention at all.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 12 is an illustration of a display provided by the Locator Element Editor;

DETAILED DESCRIPTION OF THE PREFERRED EMBODIMENTS

System Environment

Figure 1:
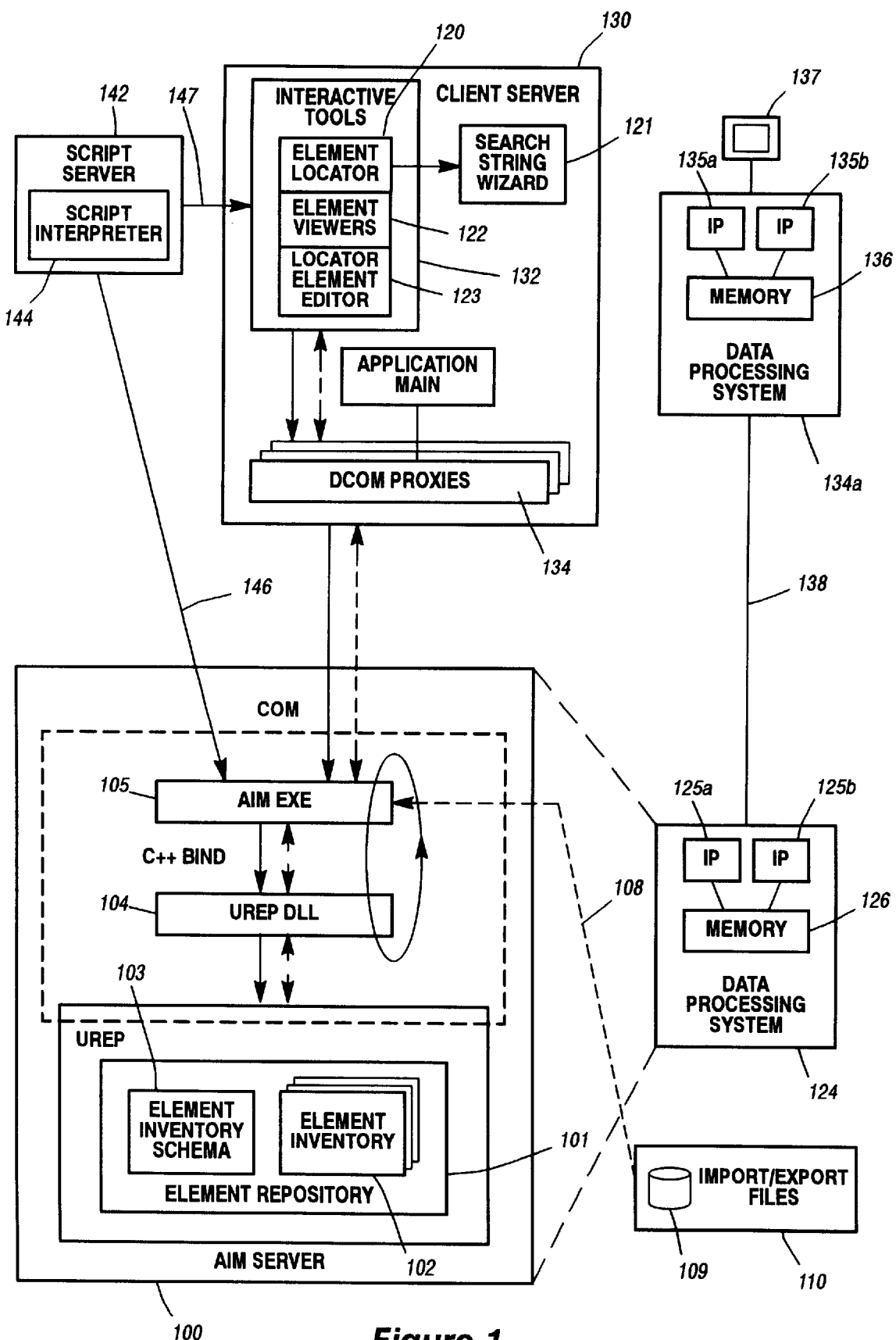
FIG. 1 is a block diagram of the major functional components of the Object Management System within which the current invention operates.

FIG. 1 is a block diagram of the major functional components of the Object Management System within which the current invention operates. The system includes Element Repository (ER) 101 residing on AIM Server 100. The ER is the repository that stores and manages persistent units of data called objects, or elements. ER 101 may be implemented across multiple hosts, each interconnected by one or more remote interfaces. In the preferred embodiment, the ER is implemented using the Unisys Universal Repository (UREP) commercially available from the Unisys Corporation, although other types of repositories could be utilized. Unisys Universal Repository (UREP) is a fully object-oriented repository for providing access to, concurrent sharing of, and immediate update support of, all objects stored within the repository. For more information on the UREP system from Unisys, see the UREP Technical Overview Publication, Document Number 8807 6971-000, available from the Unisys Corporation, which is incorporated herein by reference in its entirety. Although the Unisys UREP system is used in the preferred embodiment of this system, one skilled in the art will recognize that virtually any database could be used to implement, manage, and store the element structures discussed above. For example, a database program such as Microsoft Access, commercially-available from the Microsoft Corporation, could be used to implement Element Repository 101.

Element Repository 101 contains an Element Inventory 102. The Element Inventory is a collection of individually-addressable objects called "elements". Predetermined ones of these elements called "Locator Elements" are used to store information used to aid users in developing search requests. Unless otherwise stated, all further reference to "elements" within this specification is understood to mean "Locator Elements". The elements stored within Element Inventory 102 are arranged according to hierarchical tree structures. That is, an element generically called "Locator Element" forms the root of the hierarchical tree structure. Element "Locator Element" has relationships to other elements existing within the next lower level of the tree structure, wherein each of the related elements is considered a child of parent element "Locator Element", and defines a subtype of "Locator Element". Each of the children elements may further have children, and so on. Elements existing at the same level in the hierarchical tree are called "siblings". The specific tree structure arrangement of the Locator Elements will be discussed in more detail below.

Each of the elements stored in Element Inventory 102 is created as a particular type of element. The type of element will define the type of data stored by the element, and will also determine the type of relationships formed with other elements. In the preferred embodiment, the types of elements are defined as the Element Inventory Schema (EIS) 103, as will be discussed below.

In the current implementation of the invention, the Element Repository 101 interfaces to the UREP Dynamic Link Library (DLL) 104, which provides optimized access for the Unisys UREP database. In turn, the UREP DLL 104 interfaces with the Asset Inventory Manager Executable (AIM EXE) 105. The AIM EXE provides the services that may be called by interactive tools to retrieve element data, and element type definitions from the ER 101. One of the functions of the AIM EXE 105 is to provide an interface to the Element Repository 101 that hides the underlying repository implementation. For example, the AIM EXE hides the functions provided by the UREP DLL 104. The AIM further masks the user from any transaction management and database locking that is required to accomplish a given task. The AIM does so by providing an Application Program Interface (API) which supports the operations required by the entities accessing the various elements stored within the Element Inventory 102.

The following services are provided by the AIM EXE 105:

Connect: This service connects the session to the Element Repository 101. This service further opens the repository, makes a repository log entry in the newly created object, and begins a UREP session.

Disconnect: This service disconnects the session from the Element Repository 101. In the preferred embodiment, this is accomplished by ending the UREP session and closing the repository. This service is called with a parameter that indicates whether uncommitted changes should be discarded. If uncommitted changes exist which are not to be discarded, the request for this service is disregarded.

Export Element Types: This service reads element types from the EIS 103 and writes them into one of the Import/Export Files 110 on mass storage 109. This is shown by dashed Line 108. In the preferred embodiment, this file format is XML.

Import Element Types: This service reads element types from one of the Import/Export Files 110 in Mass Storage 109, and writes them into the EIS 103 in a predetermined format, which in the preferred embodiment is XML format. This is shown by dashed line 108. The element types are installed at initialization time, and may be updated as desired during the life of a system.

Get Element Types: This service reads element types from the EIS 103 and returns them to the caller in an output parameter. In the preferred embodiment, the output format is XML.

Put Element Types: This service reads element types from an input parameter and writes them to the EIS 103. In the preferred embodiment, the input format is XML.

Export Elements: This service reads elements from the Element Inventory 102 and writes them into one of the Import/Export Files 110 on Mass Storage 109, as is indicated by dashed line 108.

Import Elements: This service reads elements from one of the Import/Export Files 110 in Mass Storage 109, and writes them into the Element Inventory 102 as indicated by dashed line 108. This service includes options for handling already-existing elements, including the Ignore, Overwrite, and Create New Version options.

Get Elements: A service that reads elements from the Element Inventory 102 and returns them to the caller in an output parameter. The element that is to be retrieved may be specified according to an element name, or may be specified using relationship data used to address a particular element within the Element Inventory. Alternatively, this service may be called to retrieve an element storing a particular attribute character string, as will be discussed below.

Get Element for Update: This service sets an update lock on an element for a particular session, then reads the selected element from the Element Inventory 102 so that it is returned to the requester as an output parameter. The selected element may be specified by element name, or may be specified using relationship data used to address an element within the Element Inventory. Another option allows for retrieval of an element storing a specified character string.

Create Elements: A service that provides elements as input parameters so that they can be written to the Element Inventory 102.

Update Element: A service for providing elements as input parameters so that they can be written to the Element Inventory 102. This service must be preceded by a call to "Get Element for Update" service.

Delete Elements: A service that deletes specified elements from the Element Inventory 102.

Get BLOB: A service that reads a Binary Large Object (BLOB) attribute from an Element in the Element Inventory 102 and writes it into a file. The file can reside on a remote host, specified by a Universal Naming Convention (UNC) name.

Get BLOB for Update: A service that sets an update lock for this session on a BLOB Element in the Element Inventory 102, reads its BLOB attribute, and writes the BLOB attribute into a file. The file can be on a remote host, specified by UNC name.

Update BLOB: This service reads a BLOB from a file, and writes the BLOB as an attribute of a BLOB Element in the Element Repository 102. The file can be on a remote host, specified by UNC name. This service call must be preceded by Get BLOB for Update.

Save: A service which commits all uncommitted changes to the Element Inventory 102.

Undo Last: A service that rolls back the last uncommitted change to the Element Inventory 102.

Undo All: This service rolls back all uncommitted changes to the Element Inventory 102, if any such uncommitted changes exist.

The AIM EXE 105, the UREP DLL 104, and the Element Repository 101 reside on a data processing system such as that shown as Data Processing System 124. Data Processing System 124 includes one or more Instruction Processors (IPs) shown as IP 125*a* and IP 125*b,* both of which are coupled to a Memory 126.

The user interface to the AIM EXE services could be implemented locally within AIM Server, or could be provided on a remote client system. In the current implementation, the user interface is supported on remote Client Server 130, and is provided by various interactive tools used to manage and locate elements stored in Element Inventory 102. These are shown collectively as Interactive Tools 132. Interactive Tools includes Element Locator 120, which is a tool used to search for specified elements within Element Inventory 102. Element Locator 120 may be used to invoke an add-in component called the Search String Wizard (SSW) 121. SSW, which will be described in detail below, is the component used to interactively support the development of a query string using the hierarchical concept tree and lexicon. Interactive Tools further includes Element Viewers 122 that provide various graphical user interfaces for viewing the elements and element relationships stored in Element Inventory 102. Interactive Tools further provides Locator Element Editor 123 used to modify, create, and delete elements and element relationships to customize the hierarchical concept tree and lexicon to meet user needs. These tools will be discussed further below.

In the preferred embodiment, Interactive Tools 132 is implemented using Interactive Tool OLE Custom Controls (OCXs), and communication between Interactive Tools and the AIM EXE 105 is performed using Distributed Component Object Module (DCOM) protocol, as is indicated by the use of DCOM Proxies 134. One skilled in the art will recognized that the interface to the Interactive Tools 132 could be implemented in many other ways, and other communications protocols could also be used.

In one embodiment, AIM Server 100 is further capable of interfacing with Script Server 142. Script Server includes a Script Interpreter 144 that executes commands in a scripting language. Script Interpreter has a communications link shown as Line 146 with AIM EXE 105 and another communications link shown as Line 147 with Client Server 130.

The software constructs used to implement Client Server 130 reside upon a data processing system similar to that shown as Data Processing System 134*a,* having one or more IPs shown as IPs 135*a* and 135*b* coupled to a Memory 136. Data Processing System 134*a* has a User Interface 137 which may be a display terminal coupled to an 110 port of Data Processing System 134*a*. Data Processing System 134*a* is coupled to Data Processing System 124 via a communications link shown as Line 138. Script Server 142 may reside upon Data Processing System 134*a* along with Client Server 130, or may reside on a different data processing system that is similar to that shown as Data Processing System 132 of FIG. 1.

Further details associated with the infrastructure for supporting the current Object Management System are beyond the scope of the current invention. Additional information may be obtained from the co-pending patent application entitled, "An Object Management System Supporting the Use of Application Domain Knowledge Mapped to Technology Domain Knowledge", filed Oct. 14, 1998 concurrently herewith by Goiffon et al., which is assigned to the assignee of the present invention, and incorporated herein by reference in its entirety.

Elements and element definitions may be loaded into Element Repository 101 using File I/O as indicated by dashed Line 108. These import and export functions are support by the Import and Export Element services, and the Import and Export Element Type services provided by AIM EXE 105 discussed above.

As discussed above, Element Inventory 102 is a collection of individually-addressable units of data called "elements". Predetermined ones of these elements called "Locator Elements" are used to store information for aiding users in developing search requests. These elements are stored in a hierarchical tree arrangement that may be traversed by a user using a graphical user interface provided by ones of the Interactive Tools 132 to be discussed below. The traversal process can be fully controlled by a user if desired. Alternatively, the process can be partially or fully automated. Depending on pre-assigned privilege levels, the user may also be allowed to modify, or add to, the hierarchical tree structure so that future searches will locate additional terminology.

Before discussing the actual arrangement of elements, element type definitions will be described. Each element in the Element Inventory 102 is associated with a particular element type. The associated element type dictates the types of relationships an element may form with other elements, and further dictates the type of information that an element may store. These element type definitions are stored in the EIS 103.

Element Inventory Scheme (EIS)

Element Inventory Scheme (EIS) 103 is a model that defines the various element types and relationship types that can be created and stored within Object Management System. The elements and relationships that are created according to this model can then be used to create a hierarchical tree structure storing concepts and word indicators that can be used to develop a search query. Before discussing search query development, the EIS model is described in more detail.

Figure 2:
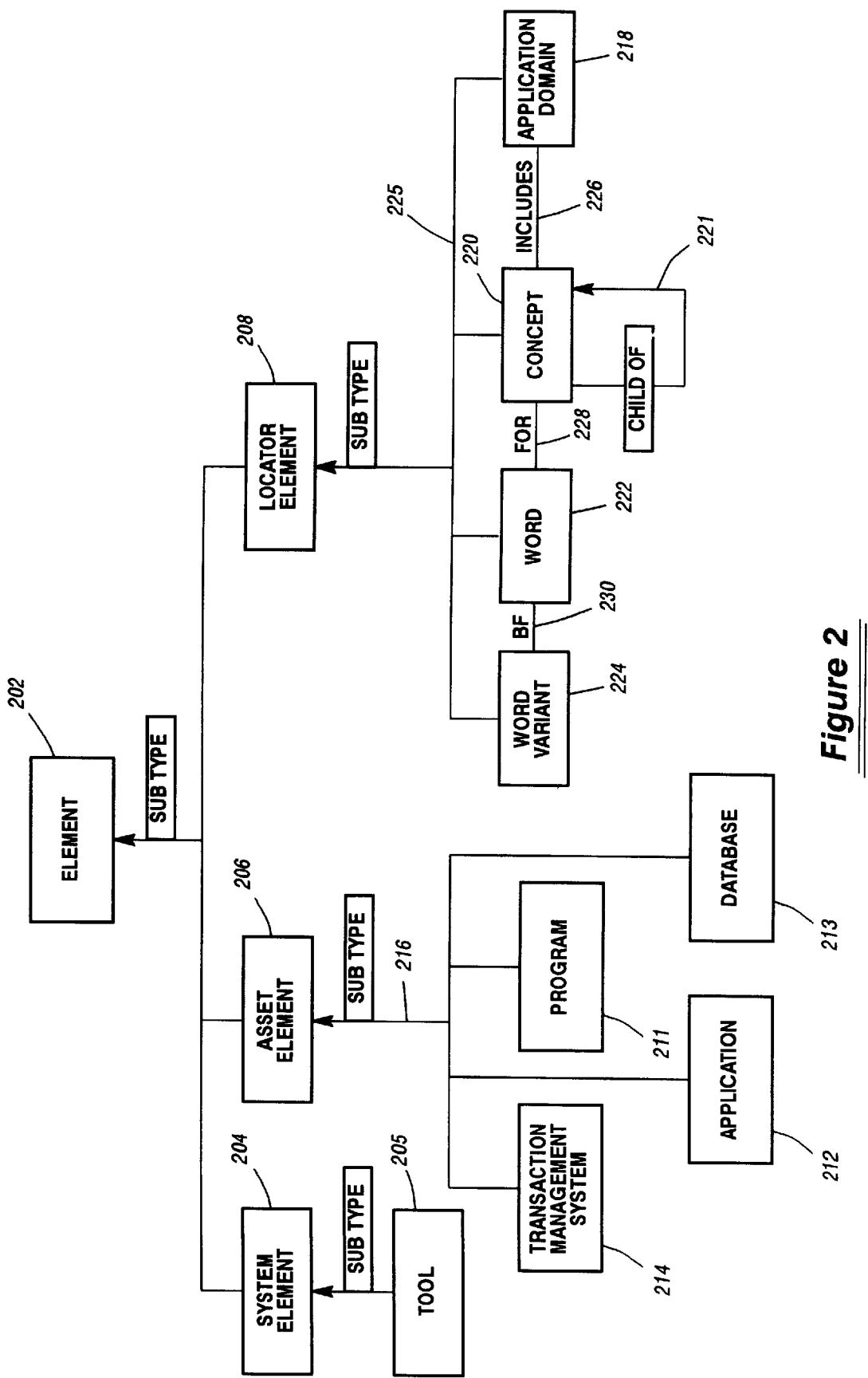
FIG. 2 is a block diagram of the model stored in the Element Inventory Scheme (EIS)

FIG. 2 is a block diagram of the model stored in the EIS 103. This model is hierarchical. In the preferred embodiment, the root Element Type is designated "Element" 202. According to one embodiment of the invention, under the root element type "Element" are three subtypes called "System Element" 204, "Asset Element" 206, and "Locator Element" 208, each of which are said to have a "subtype" relationship with the parent element type, "Element" 202. A subtype relationship allows an element subtype to inherit characteristics from the parent element type. For example, an element subtype is capable of inheriting the ability to form the relationship types the parent element type is capable of forming.

Element type "System Element" 204, and all element types which are a subtype of type "System Element", are used to define elements that support the operations of the Object Management System. For example, "System Element" has an element subtype of "Tool" 205. An element of type "Tool" is used to store meta-data about an associated tool that is used in the Object Management System. Such an element might store location and version information, for example, about Element Viewers 122. Elements of type "System Element" are largely beyond the scope of this application, and will not be discussed further.

The element type "Asset Element" 206 includes those element subtypes that are used to store data signals that are descriptive of other code and data modules residing either on Data Processing System 124, or on a different data processing system. Elements of type "Asset Element" are used to model and catalog code and data modules for purposes of enabling these modules to be reused, as is desirable in an object-oriented coding environment. For example, the subtypes of element type "Asset Element" shown in FIG. 2 as "Program" 211, "Application" 212, "Database" 213, "Transaction Management System" 214 are created to store meta-data describing such code and data modules as programs, applications, databases, and transaction management systems, respectively. The use of Asset Elements in cataloging and modeling the various code and data modules that support an Information Technology (IT) Mission of a system is described in detail in the co-pending application entitled "An Object Management System Supporting the Use of Application Domain Knowledge Mapped to Technology Domain Knowledge" incorporation herein by reference above. While the use of Asset Elements is largely beyond the scope of the current application, the development of a query to be used in performing a content-based search of Asset Elements will be discussed below.

The Element type "Locator Element" 208 and all element types which are a subtype of element type "Locator Element" 208 are the element types used to develop a search query, and are of primary interest to the current invention. Within the defined hierarchy, element type "Locator Element" has several sub-types, including element types "Application Domain" 218, "Concept" 220, "Word" 222, and "Word Variant 224". By virtue of the subtype relationship represented by Line 225, each of these subtypes inherit the characteristics of element type "Locator Element" 208. This includes the ability to form relationships of the type that can be formed by element type "Locator Element".

The four element types that have relationships of type "subtype" with element type "Locator Element" also have various relationships with one another. Element type "Application Domain" 218 has a relationship type of "includes" 226 with element type "Concept" 220, as is shown by Line 226. Element type of "Concept" 220 has a relationship type of "for" with element type of "Word" 222, as is represented by Line 228. Element type of "Word" 222 has a relationship of type "of" 230 with element type of "Word Variant" 224, as indicated by Line 230. Finally, the element type "Concept" 220 may be related to itself via a relationship of type "child of" as indicated by Line 221.

The element types that have a subtype relationship with element type "Locator Element" 208 are used to create a hierarchical concept tree structure of natural language concepts. An element of type "Application Domain" 218 is used to store an indicator of a broad application area called an Application Domain. Elements of type "Concept" are used to define concepts that have a subset relationship to a related element of element type "Application Domain". The concept hierarchy is further extended by defining other elements of type "Concept" that have a relationship of type "child of" 221 to a previously-defined Concept Element. This newly-defined Concept Element may be described as a "child" of the originally-defined "parent" concept. The child Concept Element will store a concept that is a sub-category of that stored by the parent Concept Element to which it is related. Any number of hierarchical levels within the hierarchical concept tree structure may be created, and any Concept Element may have one or more children. Children of the same parent concept are said to be "sibling" Concept Elements.

Each Concept Element, regardless of the level at which it exists within the Concept hierarchy, may have a relationship of type "for" 228 with an element of type "Word". An element of type "Word" stores a word that is somehow indicative of a concept stored by a directly-related Concept Element. An element of type "Word" 222 can be related to multiple elements of type "Concept" 220.

Finally, an element of type "Word Variant" 224 stores a derivative form of a word stored by a directly-related Word Element. This derivative form may be a plural, possessive, acronym, abbreviation, slang term, foreign language representation, or any other alternative form required or desired by a user. In the preferred embodiment, a Word or Word Variant Element stores a character string, but other representations for a word could be utilized. Elements of type "Word" 222 or "Word Variant" 224 are said to comprise the "Lexicon" of the system. The hierarchical concept tree that includes the Concept Elements, together with the Lexicon, may be said to comprise the knowledge base of the system. The creation and use of the element and relationship types shown in FIG. 2 are best explained in the examples below.

As discussed above, when elements are created and stored in the Element Inventory 102, they are created using a selected one of the type definitions stored in the EIS 103. The selected element type will determine the type of fields created within the element object, and the type of information stored by the element object. In the preferred embodiment, each element object will include a unique name indicator, several fields for storing data, and an indication of the element type. It will also include relationship indicators that indicate that relationships exist with other ones of the elements. These relationship indicators could exist as pointers to other element structures, or could be a different type of indicator, for example, the unique name of the related element structure. The use of these element type definitions is best described by example.

Figure 3:
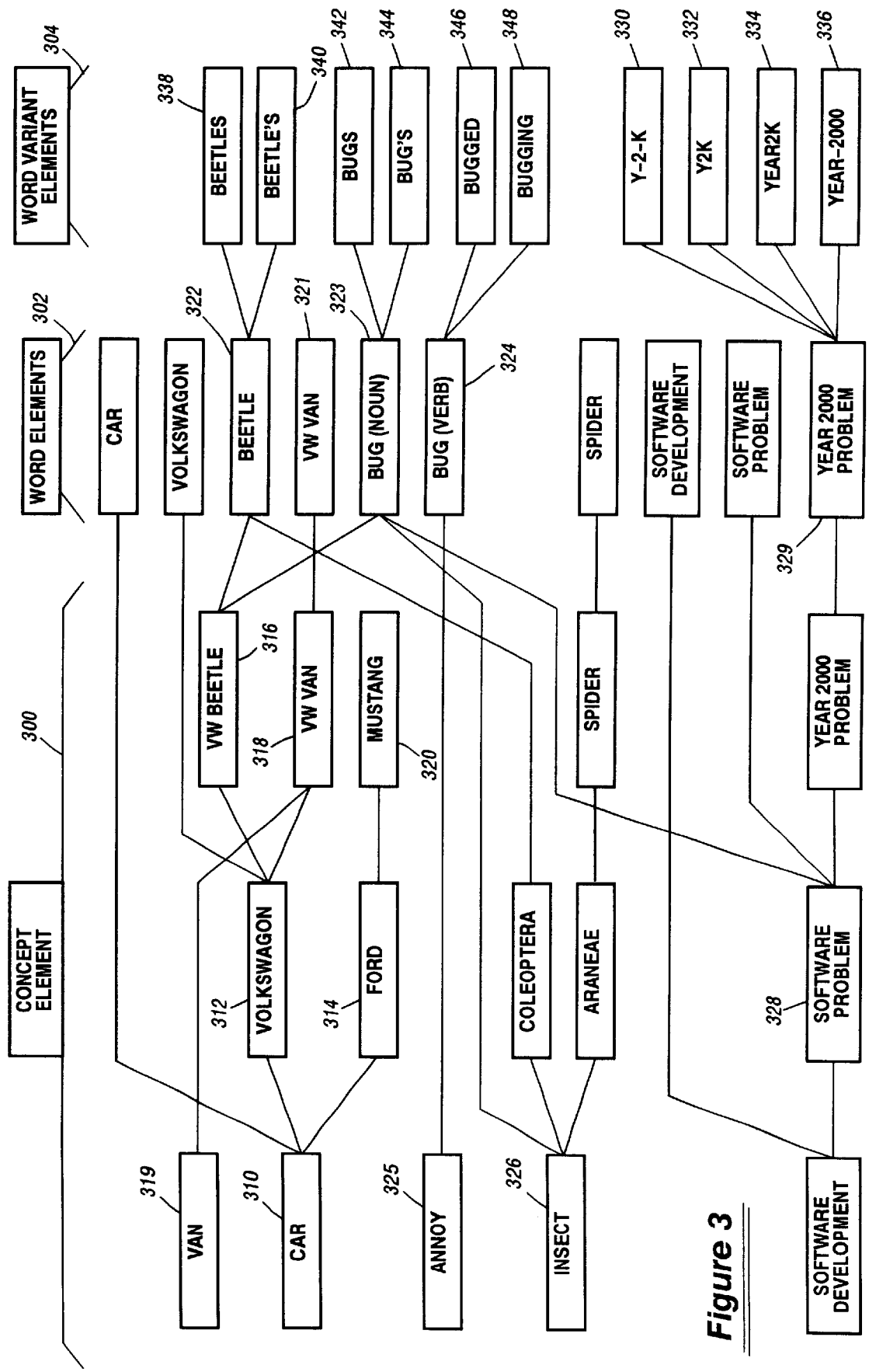
FIG. 3 is an exemplary hierarchical tree structure depicting elements and element relationships, wherein each of the elements shown stores a search term or a search concept that may be used to develop a query.

FIG. 3 is a hierarchical tree structure depicting elements and element relationships, wherein each of the elements shown stores a search term or a search concept that may be used to develop a query. This figure shows the manner in which elements form nodes of a tree structure, and the relationships between nodes forming the branches of the tree structure. In this example, elements of the type "Concept" 220 are shown in the columns indicated by Bracket 300. Elements of the type "Word" 222 are shown in the column indicated by Bracket 302. Elements of the type "Word Variant" 224 are shown in the column indicated by Bracket 304.

As discussed above, the Concept Elements store some type of indicator of a concept or idea that will be used to formulate a query. In the preferred embodiment, each of the Concept Elements stores alphanumeric string data, although other types of data may be utilized. Concepts are divided and sub-divided to form parent/child hierarchies, as modeled by the relationship shown as Line 221 of FIG. 2. For example, a relatively broad "parent" concept such as that shown as "Car" in Box 310 may be further divided into "child" sub-concepts by manufacturer such as "Volkswagon" in Box 312 and "Ford" in Box 314. Sub-concepts "Volkswagon" and "Ford" may be said to be sibling concepts because they exist at the same level of the hierarchy and have the same parent Concept Element. Sub-concepts may be further divided into additional concepts as shown in Boxes 316, 318, and 320, describing car models for the respective makes. Any level of hierarchy may be established between Concept Elements. Additionally, Concept Elements may have multiple parent Concept Elements. This is shown by the Concept Element storing "VW Van" in Box 318, which is a child of both Concept Element "Volkswagon" in Box 312, and "Van" in Box 319.

Each Concept Element, regardless of the hierarchical level at which it exists within the concept tree, may be related to Word Elements. Each Word Element stores an alphanumeric string that is related to, and indicative of, the concept stored by the related Concept Element. Generally, each Concept Element will be related to a Word Element that stores the same string stored in the Concept Element, although this need not be the case. For example, Concept Element "VW Van" in Box 318 is shown related to Word Element in Box 321 that stores the same string. As mentioned above, strings stored in Word or Word Variant Elements are said to be part of the system Lexicon, and are compared against a user-provided search term to determine the presence of a match, as will be described below.

Word Elements related to the same Concept Element may be synonyms, or may describe different aspects of the same idea. For example, in FIG. 3 two Word Elements storing the alphanumeric string "Beetle" and "Bug" used as a noun are shown in Boxes 322 and 323, respectively, related to the Concept Element which stores the concept "VW Beetle". These character strings represent terms that both may be used to describe the concept "VW Beetle". Each Concept Element may be associated with zero, one, or more than one Word Elements.

In a similar manner, each Word Element may be associated with one or more Concept Elements. This will occur when a character string represents multiple ideas. For example, the character string "Bug", when used as a noun, could be used to describe a car, an insect, or a problem in software. Thus, the Word Element in Box 323 is shown related to the three different Concept Elements listed in Boxes 316, 326, and 328, respectively.

The example of FIG. 3 further illustrates how a character string may be used in two different ways. For example, many words such as "Bug" can be both a noun or a verb. Thus, a Word Element storing the string "Bug" as a noun could be stored in a first Word Element, as shown in Box 323. Additionally, another Word Element storing the string "Bug" as a verb, as shown in Box 324, could be related to a Concept Element storing the concept "Annoy" shown in Box 325. If a word may be used in additional ways, for example, as an adverb, adjective, or the like, additional elements may be defined.

Each Word Element may further be related to one or more Word Variant Elements that each describes a different way to spell or represent the character string that is stored in the related Word Element. For example, Word Variant Elements may store acronyms, abbreviations, plural forms, or possessive forms for the character string stored in the related Word Element. If desired, they could also be slang, foreign language words, or regional expressions for a given word. To illustrate, FIG. 3 shows one of the Word Elements in Box 329 storing the character string "Year 2000 Problem" which is indicative of the software problem associated with storing dates occurring after Dec. 31, 1999. This topic has also been referred to as the "Y-2-K", the "Y2K", the "Year2K", or the "Year-2000" problem, for example. These character string variants are shown stored in Word Variant Elements represented by Boxes 330, 332, 334, and 336, respectively, and are related to the Word Element storing the original character string. In a similar manner, derivatives of the Word "Beetle" are shown in Boxes 338 and 340, and derivatives of the Word "Bug" are shown in Boxes 342–348.

The creation of elements may be performed by a user so that query development is performed according to the user's customized Lexicon. Furthermore, by modifying the interconnecting relationships between elements, the user may actually change the algorithm used to develop a particular type of search. As mentioned above, the hierarchical concept tree structure may have any number of levels of hierarchy. The creation and modification of tree structures will be discussed further below.

Using Locator Elements to Formulate a Search Query

As described above, several interactive tools shown as Interactive Tools 132 of FIG. 1 have access to elements and element type definitions stored within Element Repository 101 via services provided by AIM EXE 105. One of these interactive tools is called the Element Locator 120 which is a search tool used to search for elements stored within Element Inventory 102. The use of Element Locator 120 is described in detail in the co-pending application entitled "An Object Management System Supporting the Use of Application Domain Knowledge Mapped to Technology Domain Knowledge", referenced above.

In the preferred embodiment, the user is able to invoke an Add-In component from the Element Locator user interface. This Add-In component, called the Search String Wizard (SSW) 121 of FIG. 1, is a tool that aids the user in developing a query. The query development process as provided by SSW 121 can be highly automated, or can be an iterative process that relies heavily on user input. User options provided by the tool determine the extent of the user interaction that will be employed, as will be discussed further below.

Figure 4:
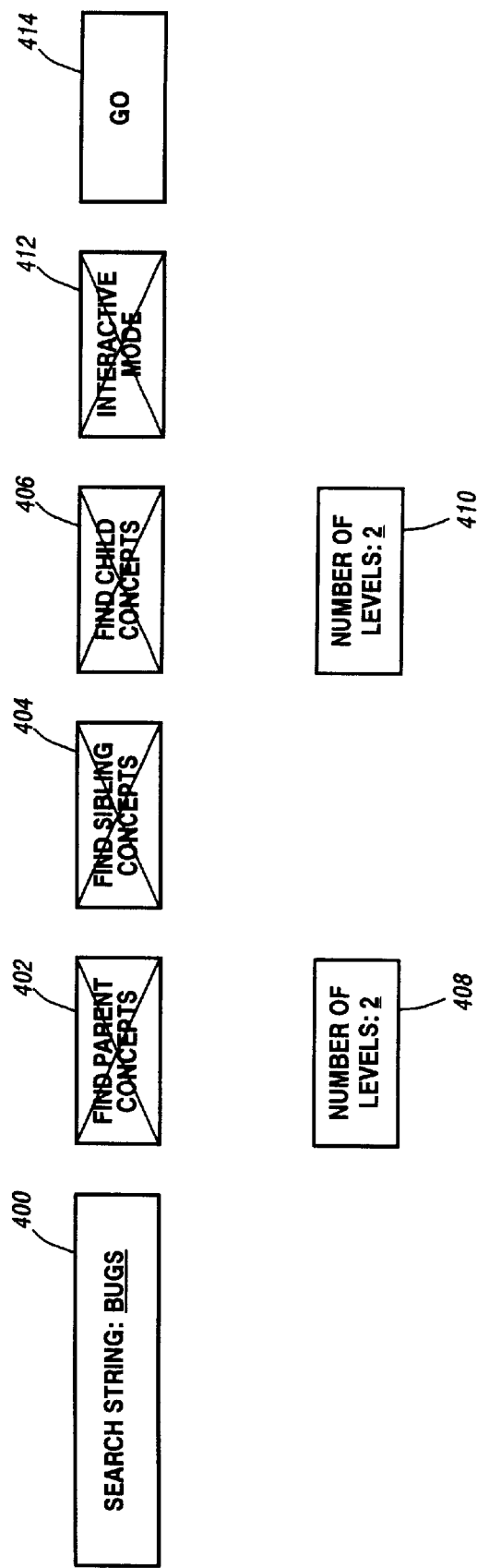
FIG. 4 is an exemplary screen provided by Search String Wizard to obtain the search string and other optional parameters required to initiate development of a search.

FIG. 4 is an exemplary screen provided by Search String Wizard (SSW) 121 to users to obtain the search string and other optional parameters required to initiate development of a search query. The user provides the initial search string in Box 400. In this example, assume the user provides the term "Bugs". The user further selects the levels of hierarchy within the hierarchical concept tree in one or more Application Domains that will be utilized to develop the search. This is accomplished by specifying whether parent, sibling, or child concepts will be included for any located concepts. These parameters are specified in Boxes 402, 404, and 406, respectively. If parent and/or child concepts are to be included, the number of levels of hierarchy to be traversed during the search development may be specified in Boxes 408 and 410. A default value of "one" is assumed if no value is provided. Finally, the extent of automation may be specified in Box 412. If the search development is to be completely automated, Box 412 is left blank. Otherwise, "Interactive Mode" is selected, which causes SSW 121 to query the user for input following each iteration of search development. The manner in which the above-mentioned options are utilized will be discussed in the examples below.

For the first example, the query term "Bugs" is provided, with Parents, Sibling, and Child concepts selected in Boxes 402–406. The Parent and Child search levels are each selected at "two" in Boxes 408 and 410, respectively, and Interactive Mode is selected in Box 412. These selections are shown in FIG. 4. After specifying these parameters, the user selects "Go" in Box 414. This causes the SSW to make a service call to the "Get Element" service discussed above, specifying that the element containing the string "Bugs" is to be returned. This causes AIM EXE 105 to search all elements having an element type of "Word" or "Word Variant" for the specified character string of "Bugs", and to return the contents of the element to SSW 121. If this character string is located within a Word Element, SSW further makes another call to the AIM EXE 105 specifying that all Word Variant Elements associated with the located Word Element are also to be retrieved. In a similar manner, if the initially-specified character string is located within a Word Variant Element, the related Word Element, and all other related Word Variant Elements, are retrieved. This retrieval of related elements might be described as "traversing" the relationships existing between the initially-specified element storing the character string "Bugs", and all other related elements.

Using the example of FIG. 4 with an initially-selected search string of "Bugs", the Word Variant Element represented by Box 342 will be located, as will the Word Variant Elements "Bug's" shown in Box 344, and the Word Element shown in Box 323 of FIG. 3.

Next, SSW locates all Concept Elements that are related to the initially-located Word Element. As shown in FIG. 3, multiple Concept Elements may be related to the same Word Element. In the current example, the Concept Elements "VW Beetle", "Insect", and "Software Problem" shown in Boxes 316, 326, and 328, respectively, will be located.

Once the first set of Concept Elements is located, and if the query development is being performed in Interactive Mode, a complete set of located Concept Elements and all located Word and Word Variant Elements are provided to the user in a user display.

Figure 5:
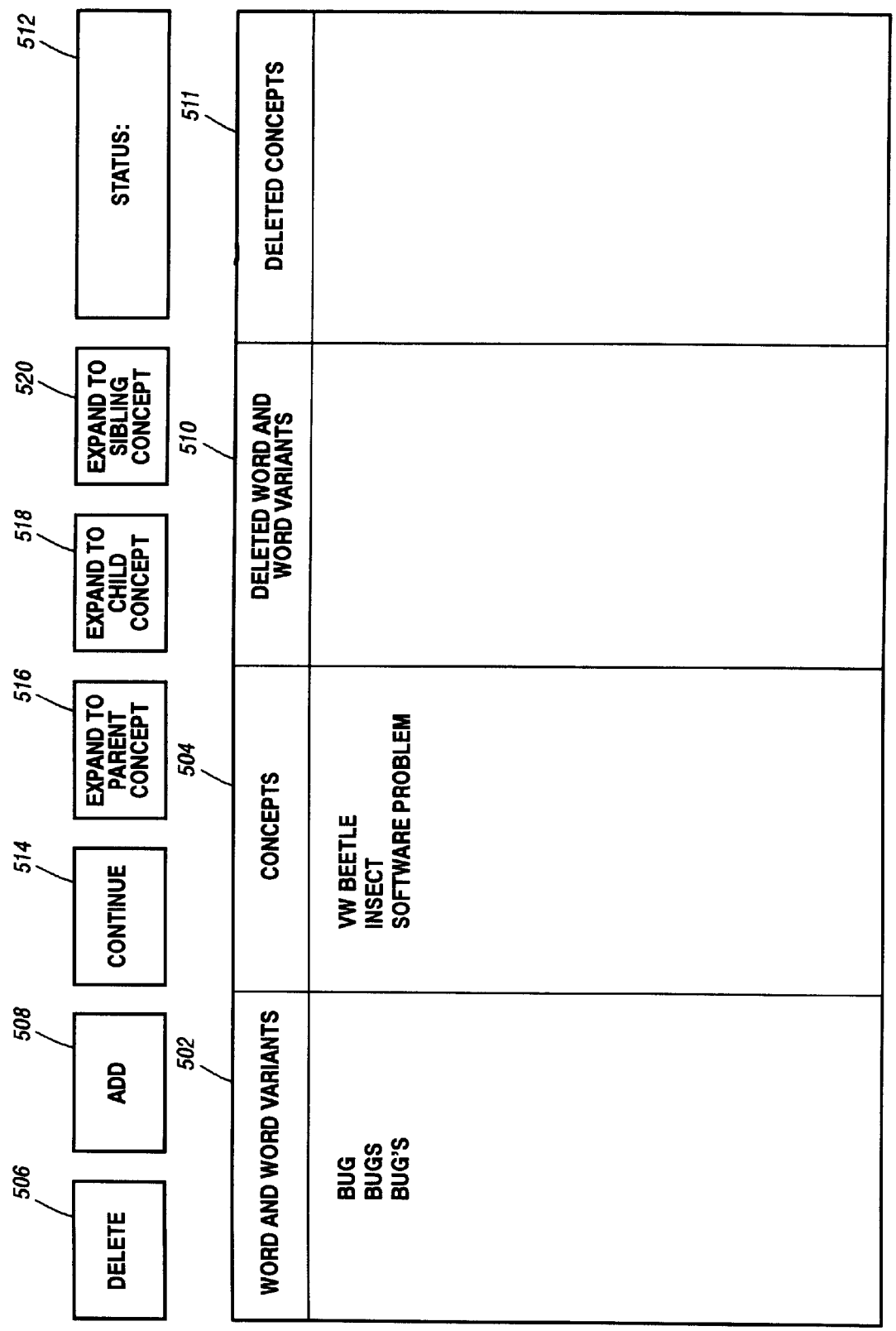
FIG. 5 is an exemplary screen display provided by Search String Wizard to the user according to the example of FIG. 4 following initiation of query development.

FIG. 5 is an exemplary screen display provided by SSW to the user according to the above example following initiation of query development. Window 502 lists all of the character strings stored in the located Word and Word Variant Elements. Window 504 lists all of the concepts stored in the located Concept Elements. The user is able to select any of these listed Concept, Word, or Word Variant items using a graphical user interface of the type known in the art. Once these items are selected, they may be removed from further consideration using the Delete Button 506.

Assume in this example the user is only concerned about developing a search query related to the concept "VW Beetle". The user employs the interactive user display to mark the concepts "Software Problem" and "Insects" for deletion, then selects "Delete Button" 506 to remove these concepts from Window 502. In a similar manner, the user is allowed to mark Word or Word Variant character strings in Window 502 for deletion. In the preferred embodiment, the user display will show the deleted Word and Word Variant character strings in Window 510, and will show the deleted Concepts in Window 511. The user is able to re-add words or concepts that have been deleted by selecting them from Windows 510 and 511, respectively, then using the "Add Button" 508 to re-add the item to the appropriate Window 502 or 504.

When the user has modified the returned concepts in the manner desired, and assuming query development is not yet complete as indicated in Status Window 512, the "Continue Button" 514 is selected and the next level of query development is performed according to the originally-selected parameters. Use of functions shown in Boxes 516, 518, and 520, which provide a means for selectively expanding a search beyond what it would otherwise include, will be discussed below.

Returning to the current example, the user specified that for the originally-located concepts, Parent, Sibling, and Child concepts were to be located. This is shown in selection Boxes 402, 404, and 406, respectively of FIG. 4. The only concept remaining after user modifications were performed is "VW Beetle". According to the selection parameters, SSW 121 navigates elemental relationships associated with the concept "VW Beetle" to locate any Parent, Child, or Sibling Concepts. In the current example of FIG. 3, the concept element representing concept "VW Beetle" shown in Box 316 is not related to any child concept elements. However, it is related to Sibling Concept Element "VW Van" in Box 318, and is further related to Parent Concept "Volkswagon" shown in Box 312. These concepts are therefor further added to the list of desired concepts. Furthermore, all Word Elements having relationships to these newly-located Concept Elements, and all Word Variant Elements associated with the newly-located Word Elements, are added to the list of located Word or Word Variant Elements. It may be recalled that any Concept Element, regardless of the level of the hierarchical concept tree within which it resides, may be associated with Word Elements. The newly-located elements are provided to the user in the user display.

Figure 6:
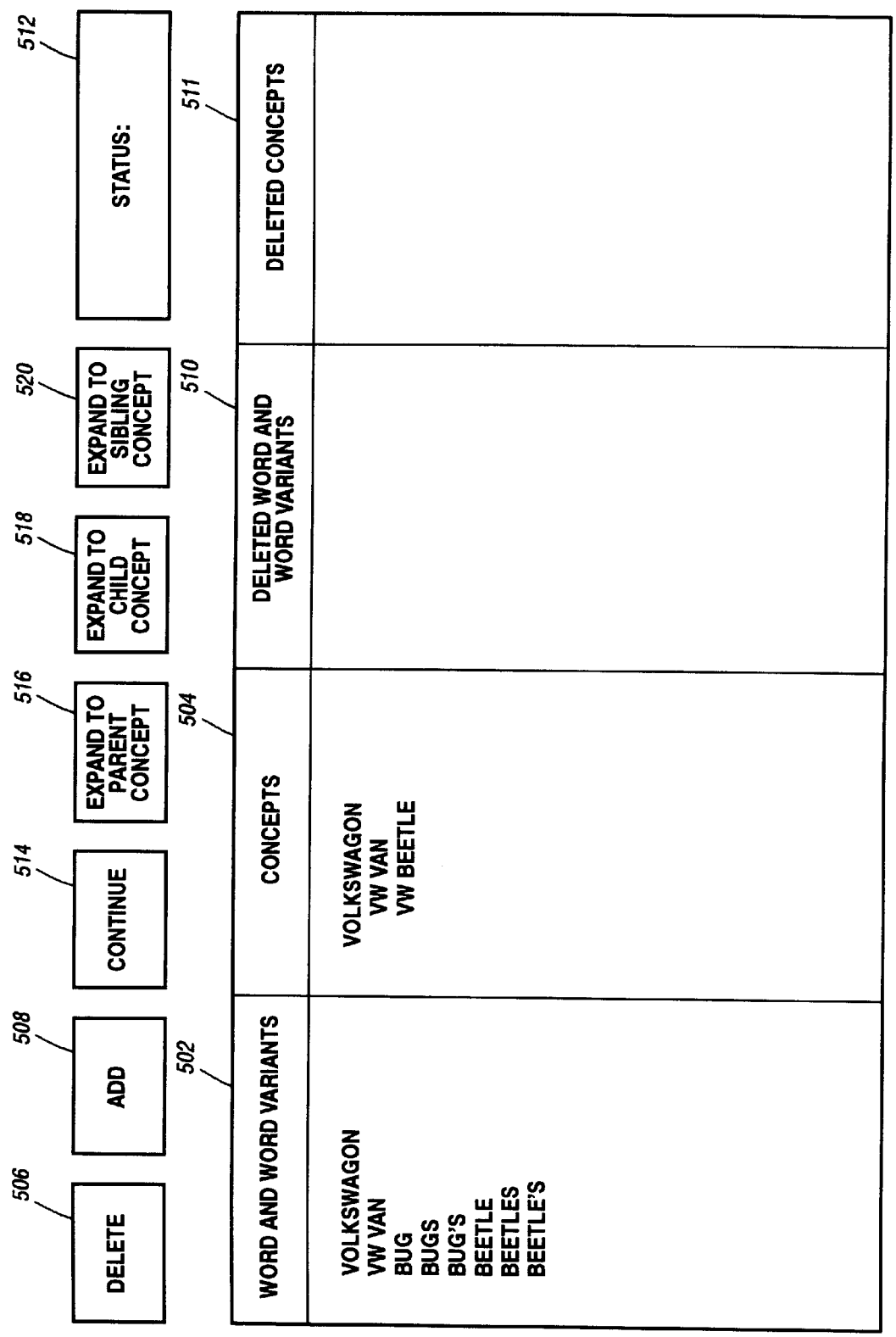
FIG. 6 is an updated Search String Wizard display after a first iteration of the query development process is performed.

FIG. 6 is an updated SSW display after a first iteration of query development is performed in the current example. All newly-located Word and Word Variant character strings are shown in Window 502, with newly-located concepts "Volkswagon" and "VW Van" shown in Window 504. In the preferred embodiment, the newly-located words and concepts are depicted in a manner that allows them to stand out from previously-processed elements. FIG. 6 shows them in bold print. Alternatively, they could be listed in a different color, or even in different Windows. It may further be noted that the concepts are presented in a manner that allows the user to understand the hierarchical structure of the concept tree, with sub-concepts appearing indented below the associated concepts. The user may edit this display in the same manner described above in reference to FIG. 5. Assuming that Status Window 512 still does not indicate that query development is completed, the user re-selects the "Continue Button" 514 and the process continues.

In this example, the user specified that concept traversal is to be performed at two levels within the concept hierarchy for parents, and is further to be performed at two levels within the concept hierarchy for children. This is shown in Boxes 408 and 410, respectively, of FIG. 4. So far in the current example, concept traversal has only occurred for one level. That is, for originally-located Concept Element "VW Bug", SSW has traversed up one level in the hierarchical tree to locate "Volkswagon". To complete the desired search development, another level of traversal must occur. Therefore, after the user selects the "Continue Button" 514, SSW traverses the element relationships to find the concept in Box 310, "Car". If any additional Word or Word Variant Elements are related to this Concept Element, they are further added to the located list of search items. If a Child of a Child Concept Element had existed for Concept Element "VW Beetle", traversal of the hierarchical tree would also continue for child concepts as well.

Figure 7:
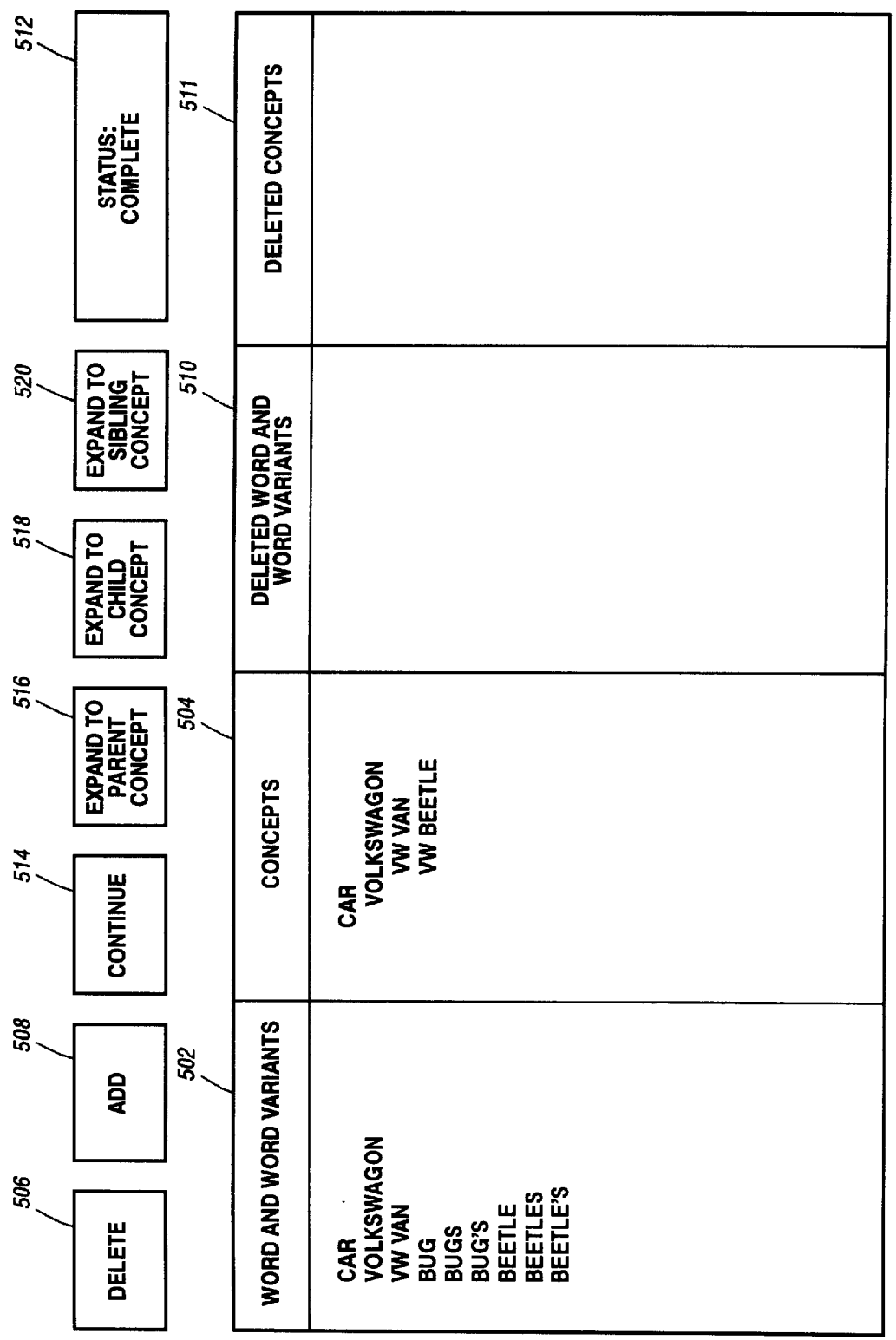
FIG. 7 is a display of the updated list for search development following the second iteration of query development.

FIG. 7 is a display of the updated list for search development following the second iteration of query development. Again, all newly-located concepts and words are shown in bold print. Status Window 512 now shows that the originally-selected query development specifications have been met. That is, two levels in both the parent and child concept hierarchy have been traversed.

At this point, the additional functions shown in FIG. 5 as "Expand to Parent Concept" 516, "Expand to Sibling Concept" 518, and "Expand to Child Concept" 520 will be discussed. These functions are used after first selecting a given concept from Window 504, then selecting one or more of these functions and hitting the "Continue" Button 514. This function will find all Parent, Sibling, or Child concepts for the selected concept, and will further provide these newly-located concepts in Window 504. These functions will further locate all Word and Word Variant Elements associated with the newly-located concepts and will add these located words to the list in Window 502. These functions provide a way for a user to control the expansion of the search query in a way that does not necessarily fit into the initial search request, and in this respect might be described as "search expansion" functions. For example, assume the user wanted to determine all child Concept Elements for the Concept Element "Car". These child Concept Elements would not be located by the parameters that were initially specified as shown in FIG. 4. However, using these additional functions, the user is able to explore this portion of the concept tree to potentially find additional relevant search terms. These functions may be utilized at any stage of query development when Interactive Mode is utilized, or may be used following search completion when the Interactive Mode is not selected.

Once the user has determined that all desired strings have been located in Window 502, the user selects the "Continue" button in Box 514. This causes the user to enter a screen in SSW which is a search string editor. This display allows the user to rearrange the search terms into a search string that includes standard logical operators like AND, OR, and NOT, and parenthesis to allow for search hierarchy. The syntax used to described these logical operators will be determined by a set of rules which is loaded to customize the SSW for a particular predetermined search environment. It will be recalled that SSW is an add-in component that in the preferred embodiment is invoked from Element Locator 120. However, SSW may also be used in many other search environments in a manner to be described below. As such, the syntax for using logical operations will vary, for example, between the use of "OR" and "+" to describe the logical "OR" function. SSW will insert the appropriate syntax required by the search tool that will is to receive the developed string.

Once the user has completed developing the search string using the search terms, the search string may be written to a file, or may further be made available for use by the target search environment.

The above description exemplifies the Interactive Mode shown selected in Box 412 of FIG. 4. If this mode is not selected using the Interactive Mode button 412, the user is not provided with an interactive display following each iteration of the search in the manner that is described above. Instead, the search query is expanded automatically in what might be described as "Non-Interactive Mode" according to the initially-selected parameters. When the search has been completely expanded, the user is provided with a screen including all located Concept, Word, and Word Variant Elements. The user is allowed to delete elements from this display, and is further allowed to utilize the "Expand to Parent Concept", "Expand to Child Concept" and "Expand to Sibling Concept" functions on any selected Concept Element as discussed above. Finally, the user may select the Continue button 514 so that the terms may be formulated into a search string including logical operators in the manner described above.

Figure 8:
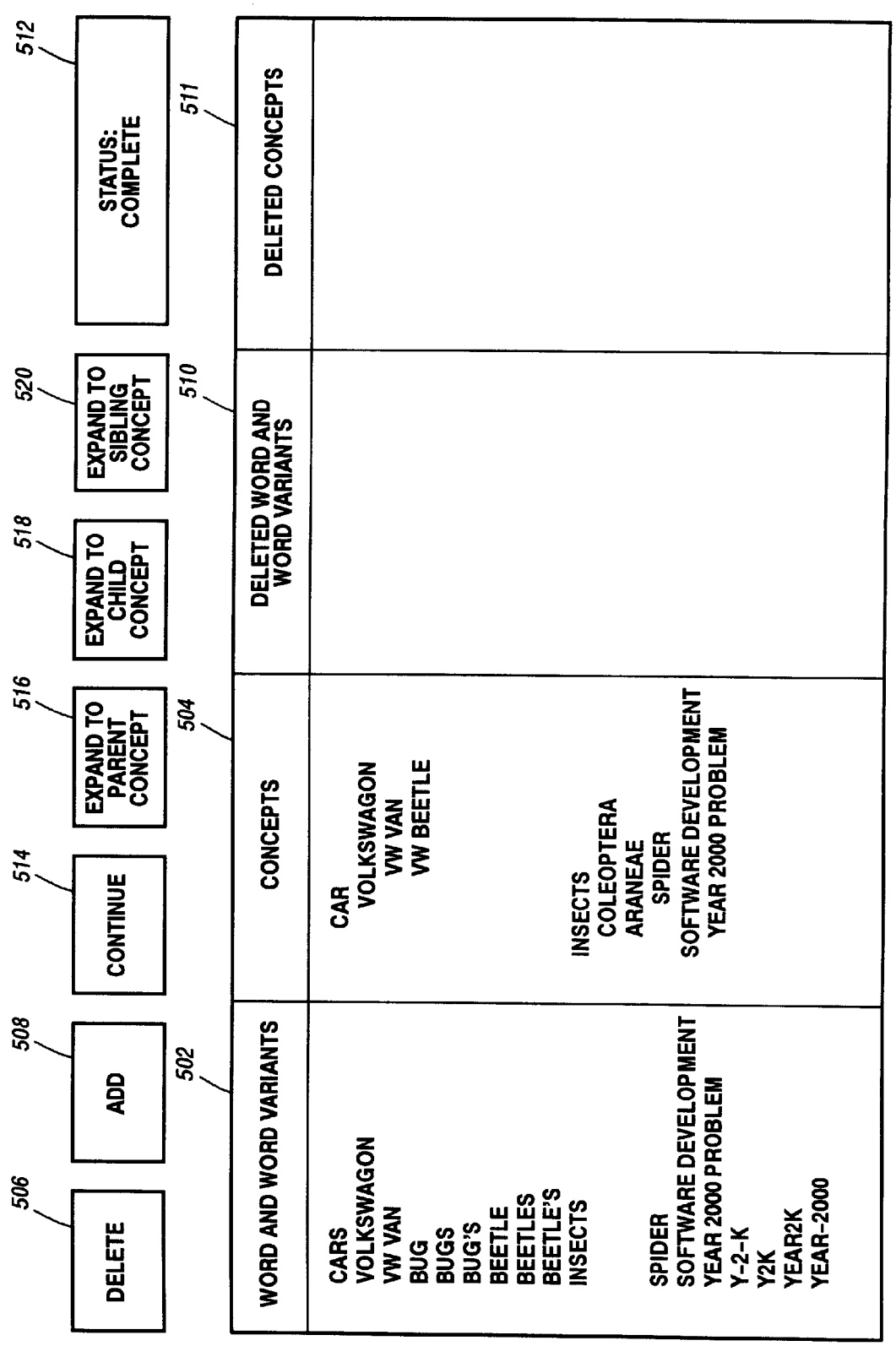
FIG. 8 is an example of the Search String Wizard display after query development is performed in non-interactive mode using all of the other selection parameters of FIG. 4.

FIG. 8 is an example of the SSW display after query development is performed in Non-Interactive Mode using all of the other selection parameters of FIG. 4. As can be seen, this mode has the potential to return a large list of unrelated concepts and character strings. The user may utilize this mode to get a "feel" for the terms included in the lexicon, and may thereafter utilize Interactive Mode to create the actual query. This mode might also be useful if the user is already familiar with the content and structure of the lexicon.

According to yet another embodiment of the invention, the user may invoke SSW 121 in a batch mode with the input parameters shown in FIG. 4. Using batch mode, a complete set of search terms is located such as that shown in FIG. 8. In this mode, the finished query may be written to a file, or may be programmatically returned to the calling search tool. The query may thereafter be processed by a script running on Script Server 142 to programmatically insert logical operators into the query. For example, script commands can be utilized to programmatically insert a logical operator "OR" between each of the search terms included in the query.

Using the above-discussed modes of operation, including Interactive Mode, Non-Interactive Mode, and Batch Mode, the amount of required user interaction varies greatly. Interactive Mode requires user interaction during every iteration of the concept tree traversal, Non-Interactive Mode requires user interaction only at completion of the initial Element Inventory search, and Batch Mode does not require any interaction. This provides a very versatile system that can accommodate the query development needs of any type of user.

FIGS. 9A–9D, when configured as shown in FIG. 9, is a flowchart of the above-described process performed by SSW 121. Step 902 shows SSW retrieving a search string and search options from the user. This user interface can be programmatically invoked as described above. If it is, the initial search string and search options are provided by Script Controller 142 instead of a user. Step 904 shows the Word and Word Variant Elements being searched for the search string. This can be accomplished by a call to the AIM EXE service "Get Elements" with an option of locating the elements with the specified character string. In Steps 906 and 908, the Word and Word Variant Elements associated with the located elements are also located. This can be accomplished by invoking the "Get Elements" service and specifying relationship data retrieved from previously located elements, wherein the relationship data can be used to address the elements in the Element Inventory. Step 910 shows all Concept Elements related to the related Word Element being located. Decision Step 912 determines whether Interactive Mode is selected. If not, search expansion continues automatically. Otherwise, Interactive Mode is entered until the user selects the "Continue" function as shown in Step 914. Interactive mode is discussed below in reference to FIG. 9D. Processing continues with locating all Word and Word Variant Elements for all remaining Concept Elements as shown in Step 916. Execution continues to FIG. 9B as shown by Arrow 918.

Decision Step 920 determines whether Sibling Concepts are to be added. This decision is based on the user-provided or script-provided selection parameters. If sibling concepts are to be added for the initially located Concept Elements, any such sibling Concept Elements are located and added to the list as shown in Step 922. Similar determinations are made for the Child and Parent concepts of the initially-located Concept Elements that are still remaining (that is, for those elements that have not be removed from consideration by a user operating in Interactive Mode.) These decisions are shown in decision Steps 924, and 926, respectively. If the user has selected the addition of either child or parent concepts, any such elements are located and added to the list, as shown in Steps 928 and 930, respectively.

Next, if execution is occurring in Interactive Mode as determined in decision Step 932, Interactive Mode is entered until the Continue function is selected, as shown in Step 934. Interactive Mode is described below in reference to FIG. 9D. Execution continues by determining if any levels in the child hierarchy remain to be traversed based on the user selections. If so, all children Concept Elements located in the previous iteration are analyzed to determine if those elements also have children. If so, these Concept Element, and any related Word and Word Variant Elements are added to the list. This is shown in decision Step 936, and in Steps 938 and 940. Next, processing continues with FIG. 9C as shown by arrow 942. This same process is repeated for the parent Concept Elements located in the previous iteration. This is shown in Decision Step 946, and in Step 948 and 950. Processing continues by again determining whether Interactive Mode is selected, as shown by Arrow 952, and another iteration will be performed. When all levels of hierarchy have been traversed for the user-specified parameters, a complete display of the located elements will be provided by the user in Interactive Mode, as shown in Step 954, and the process is completed.

Figure 9A:
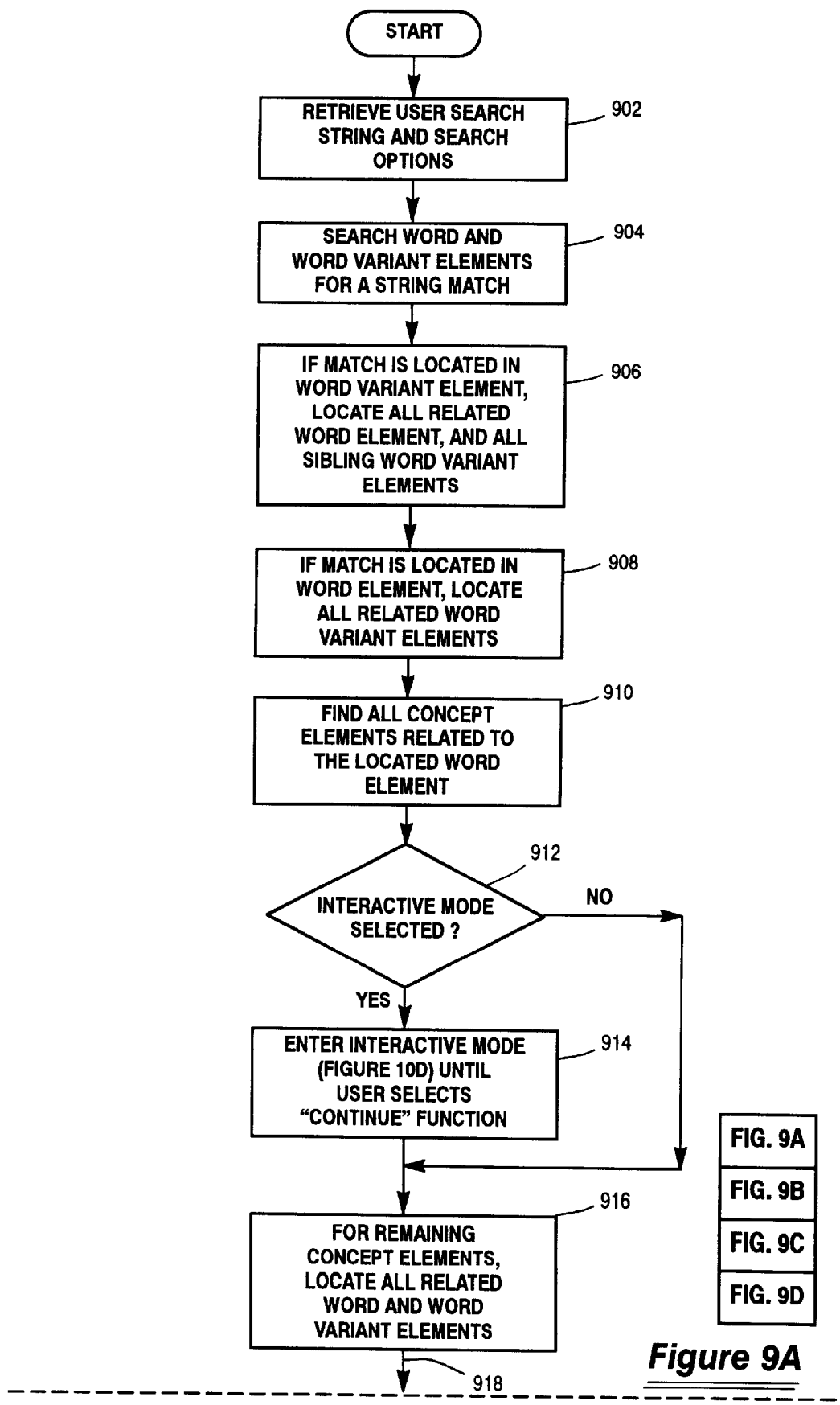
FIGS. 9A–9D, when configured as shown in FIG. 9, are a flowchart of the above-described process performed by the Search String Wizard.
Figure 9B:
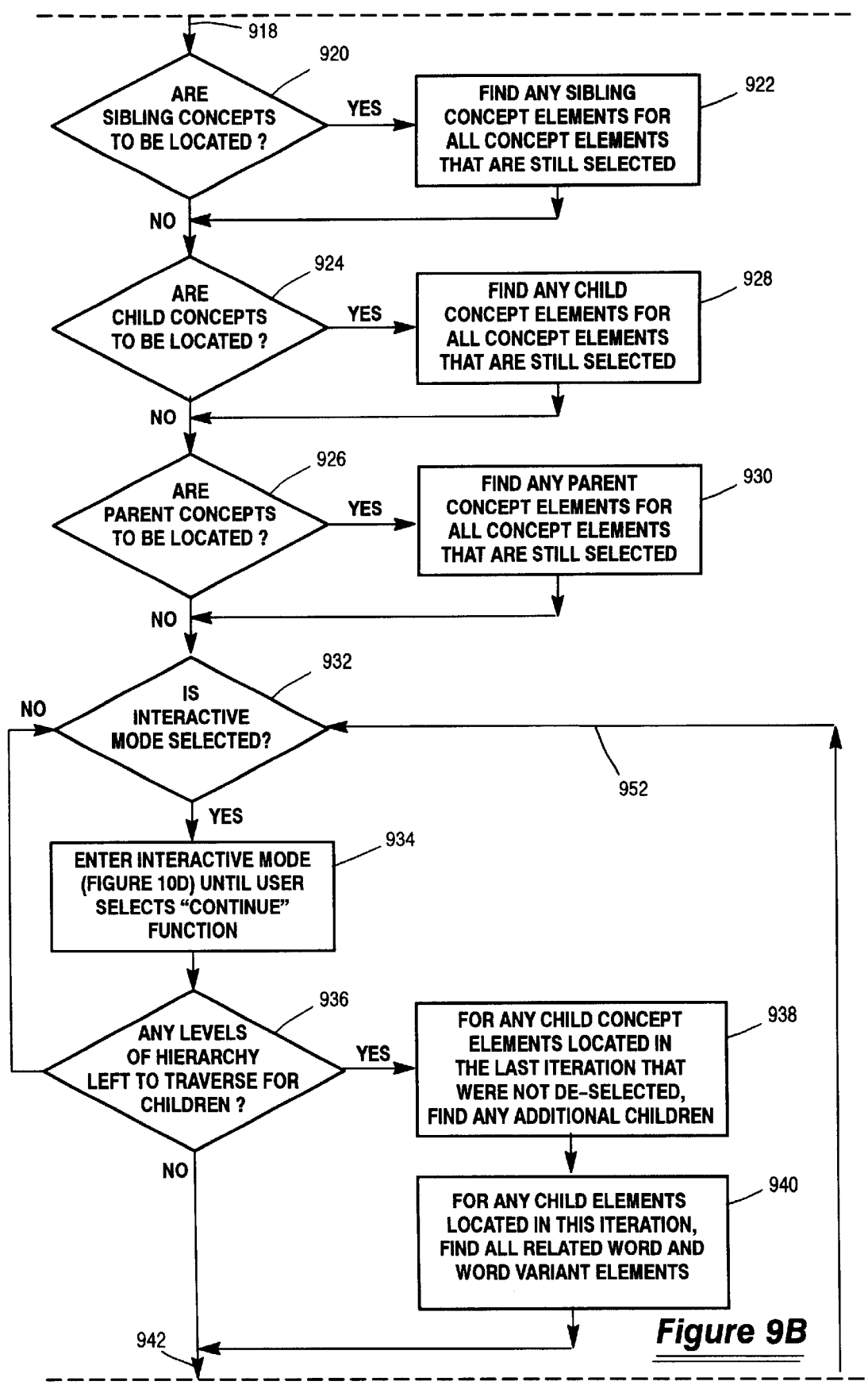
Figure 9C:
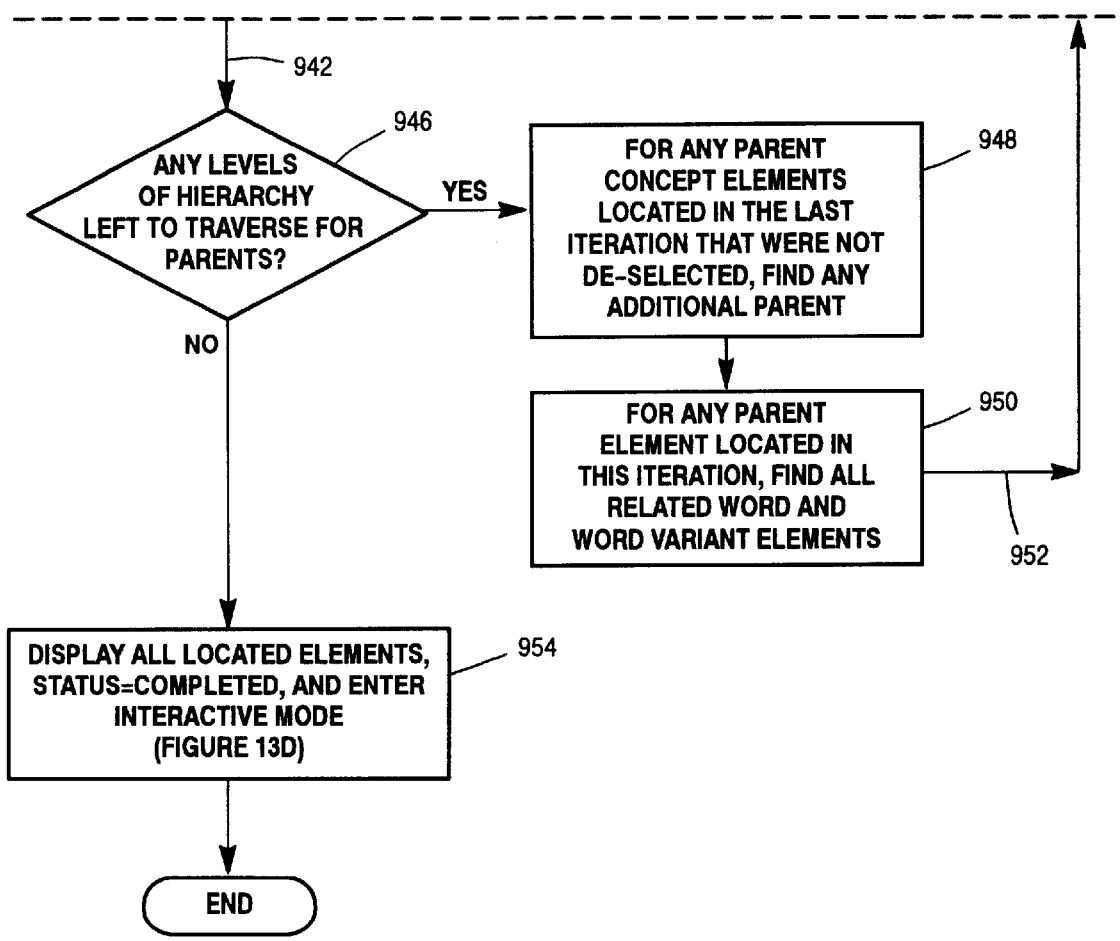
Figure 9D:
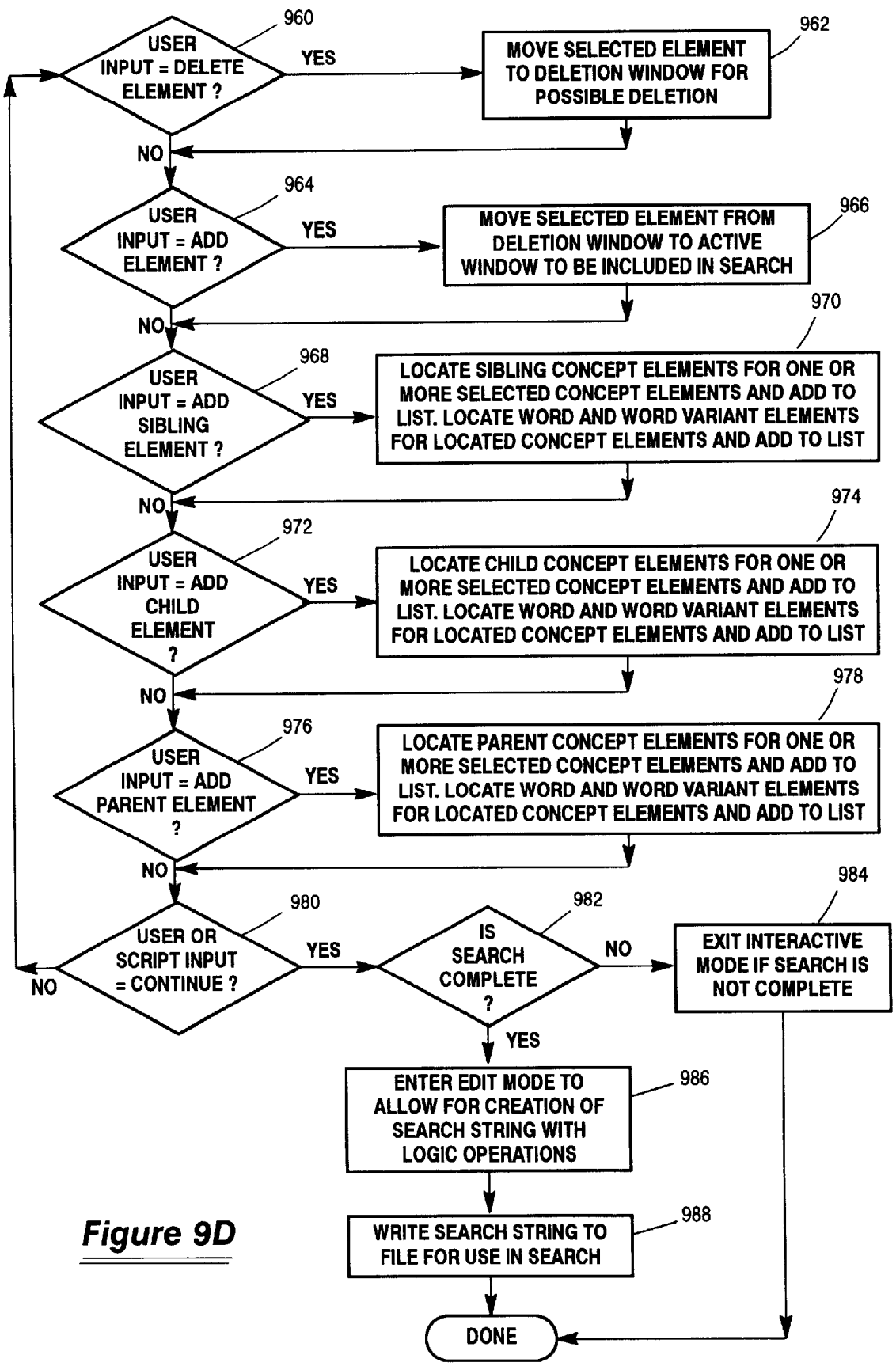

FIG. 9D is a flowchart of the SSW Interactive Mode execution flow. The program waits for user input, or in the case of script execution, programmatically-provided commands. If an element in either Window 502 or 504 of the display is selected for deletion using Delete button 506, the element is moved to Window 510 as discussed above. This is shown in decision Step 960 and Step 962. Similarly, if an element is selected for re-addition using the Add button 508, the element will be moved from Window 510 to Window 502 or 504 as shown in Steps 964 and 966. The user or the script is further allowed to select a Concept Element in Window 504 so that any sibling Concept Element and all related Word and Word Variant Elements may be added to the display. This is shown in Steps 968 and 970. A similar function may be selected to locate children Concept Elements and/or parent Concept Elements. This is shown by Steps 972 and 974, and in Steps 976 and 978, respectively. If the user or a script selects the Continue function, Interactive Mode is exited and the search continues if additional searching is required. This is shown in decision Steps 980, and 982, and is Step 984. Otherwise, the edit function of SSW is invoked to allow for the addition of logical operators in the formation of a query string. This is shown in Step 986. Finally, the query string is may be written to a file as shown in Step 988, or otherwise provided to the target search tool, and the process is complete.

Using the Developed Query String

Once developed by the SSW 121, the query string may be used in a number of different ways. It may be provided via a communications connection to a web-based search engine running on any local or remote server. If the search engine has the capability to be programmatically invoked, the search string may be supplied to the search engine without human intervention. Alternatively, a user may copy the search string from a file or "clipboard" and manually provide it to the search engine. The search string may then be used in searching web pages, for example. Any search engine may use the previously-developed query string, as long as the string is formatted with the appropriate syntax as required by the search engine. The SSW will be loaded with one or more rule sets so that the query string may be developed with the appropriate syntax based on the selected target search tool that is to receive the query string.

The query string may also be supplied to a text editor such as the Microsoft Word for Windows program commercially available from the Microsoft Corporation. In a manner similar to that described above, the string may be manually copied by a user into a search function of the text editor so that a search of a text document can be performed. Alternatively, if the editor is capable of being programmatically invoked, the search string may be provided to the editor so that a search may be performed without the use of human intervention. As is described above, the string must be formatted as required by the text editor, which may be accomplished through the use of rule sets provided to the SSW 121.

In a like manner, the query string may be provided either manually or through a programmatic interface to a file management program such as Microsoft Explorer commercially available from the Microsoft Corporation. The string can be used to perform a search for files having a particular name, or for text stored in one or more specified files.

According to yet another embodiment of the invention, the search string may be utilized to search storage structures that reside within the same repository as the Locator Elements. As discussed above in reference to FIG. 2, other types of elements such as Asset Elements reside in Element Inventory 102. Each Asset Element stores data that is descriptive of an associated code, data, and system component that resides on another data processing platform being managed by Object Management System. Each Asset Element either directly or indirectly describes the location of the respective component, and further models the types of relationships that a component has with other code, data, and system components. For example, a particular "Program" Asset Element may store data that is descriptive of a program module stored within another data processing platform. This Program Asset Element may have a relationship to a "Table" Asset Element, wherein the Table Asset Element stored information about a Table. The relationship models the relationship between the actual Program component and the Table. This type of modeling using Asset Elements is used to catalog and track reusable code and data modules so that they may be used within an Object Oriented Environment. For more information on the use of Asset Elements in modeling code and data components for an object-oriented coding environment, see the co-pending application entitled, "An Object Management System Supporting the Use of Application Domain Knowledge Mapped to Technology Domain Knowledge" referenced above.

According to the preferred embodiment, each Asset Element contains attribute fields storing element attributes that are descriptive of the data stored by the element, or descriptive of the associated code or data module. For example, this data may be a comment field describing the various functions performed by the associated program component. The search string developed using the SSW in the manner described above may be programmatically supplied to the Element Locator 120 to be used in searching the attribute fields of the elements in the Element Inventory 102.

Figure 10:
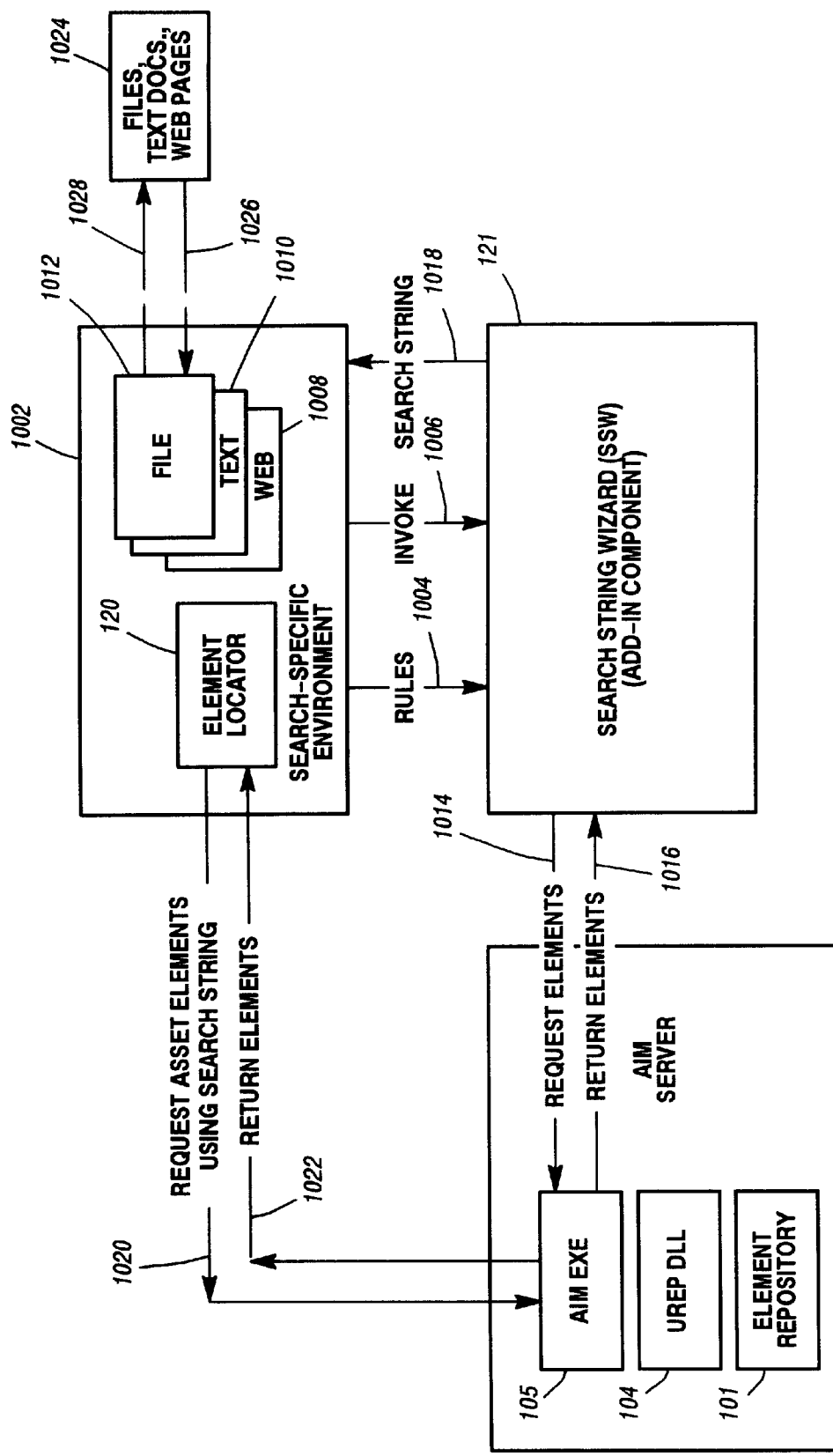
FIG. 10 is a block diagram showing how a query string developed by Search String Wizard may be utilized.

FIG. 10 is a block diagram providing various examples of utilizing a query string developed by Search String Wizard (SSW) 121. Search String Wizard 121 is an add-in component that can be installed for use with any number of Search-Specific Environments that are shown as Box 1002. First SSW will be loaded with one or more sets of rules to inform SSW of the desired syntax to be used in developing the search. The syntax is based on the particular Search-Specific Environment. This initialization step is shown by Arrow 1004. Then SSW may be invoked from the Search-Specific Environment, as shown by Arrow 1006.

In the embodiment described above, Element Locator 120 is used to invoke SSW 121. However, the tool could also be invoked using interfaces from other search tools. For example, a Web-based search browser represented by Block 1008 could be utilized. Alternatively, a text editor represented by Block 1010, or a file manager illustrated as Block 1012, could be used to invoke the add-in component. Once invoked, the user will specify the input parameters and the desired mode of operation. SSW will retrieve Locator Elements from Element Repository 101 via service calls to AIM EXE 105, as shown by Arrow 1014. The requested elements are returned to SSW, as illustrated by Arrow 1016, so the search query can be formatted according to user specifications, including the use of any logical operators. Thereafter, the search string may be programmatically returned to the Search-Specific Environment in Block 1002 as depicted by Arrow 1018, or the search string may be manually copied, for example, by use of a "clip-board". In one embodiment, the search string will be provided to Element Locator 120, which uses the search string to make service calls to AIM EXE 105 to search the Attribute Fields of Asset Elements. This is shown by Arrow 1020. The located Asset Elements are thereafter returned to Element Locator 120 as shown by Arrow 1022. Alternatively, the search string may be used by the web-based search browser shown in Block 1008, the text editor as shown in Block 1010, or a file manager as shown in Block 1012, to search a group of files, web pages, or text documents as represented by Block 1024. This use of the query string is shown by Arrows 1026 and 1028.

Installing and Modifying the Hierarchical Concept Tree

The current system provides several tools that may be used to add to, or change, the Lexicon of the system as stored in the Word and Word Variant Elements. The user is further able to create, modify, or delete selected Concept Elements, and is allowed to change the relationships between Concept Elements so that the categories and organization of the hierarchical concept tree match user requirements. Additionally, relationships between Word and Concept Elements, as well as relationships between Word and Word Variant Elements, may be added, deleted, or modified. This allows the user to customize the hierarchical concept tree. It further allows the user to create a Lexicon that matches a particular regional dialect, employs terms that are unique to a particular user application, includes the desired slang terms, abbreviations, acronyms, and etc., and that is generally customized for the information the user is seeking to manage. Using the customized knowledge base, the user is able to develop a search that will return the necessary data with a minimal amount of time and effort.

Element Inventory 102 is initially loaded with one or more selected Application Domains as required by user needs. An Application Domain is a set of related Concept, Word, and Word Variant Elements. Using the model of FIG. 2, an Application Domain may be described as including all elements of type "Concept" 220 that are directly or indirectly related to a particular element of type "Application Domain" 218, along with all Word and Word Variant Elements related to the included Concept Elements. In general, the Concept, Word, and Word Variant Elements related to the same Application Domain Element are associated with the same broad topic, for example, "insects". Loading of Applications Domains may be performed using File I/O via calls to the Export and Import Element service calls provided by AIM EXE 105. This is shown by Line 108 on FIG. 1. After the system is initially loaded, additional Application Domains may be developed on a remote system and loaded to update the Element Inventory 102 as required by changing user needs. One or more of Application Domain packages are commercially-available from the Unisys Corporation.

As mentioned above, the initially-loaded Lexicon and associated hierarchical concept tree as included within one or more Application Domains may be managed and modified by the user. One of the tools included within Interactive Tools 132 to aid in this task is the Element Viewers 122 of FIG. 1. Element Viewers 122 provide four different functions, or "views" that allow a user to graphically visualize the elements and element relationships that are stored within Element Inventory 102. This process of graphically visualizing the element structures is helpful in allowing a user to decide upon changes that are to be made to the inventory.

The first view, which provides the default view of the system, is the Element Explorer View. This view informs the user of the elements/element type matchings. (For example, the view will inform a user that an element is of the element type "Word Variant", "Word", or "Concept".) This view allows a user to specify a particular element type as defined within the EIS 103, and in response, provides a list of all of the elements stored within the Element Inventory 102 that are of the type specified.

From the default view, the user is able to select one of the other views, including the Properties View, Relationships View, or Affinity View. The Properties View enables the user to view the list of attributes associated with a selected element or element type, and which are stored within the Element Inventory 102. Element attributes are discussed above in reference to performing a text search of the contents of elements in the Element Inventory using the developed query string. The Relationships View is a graphical illustration of the relationships existing between a selected element and other elements, or between a selected element type and other element types.

Figure 11A:
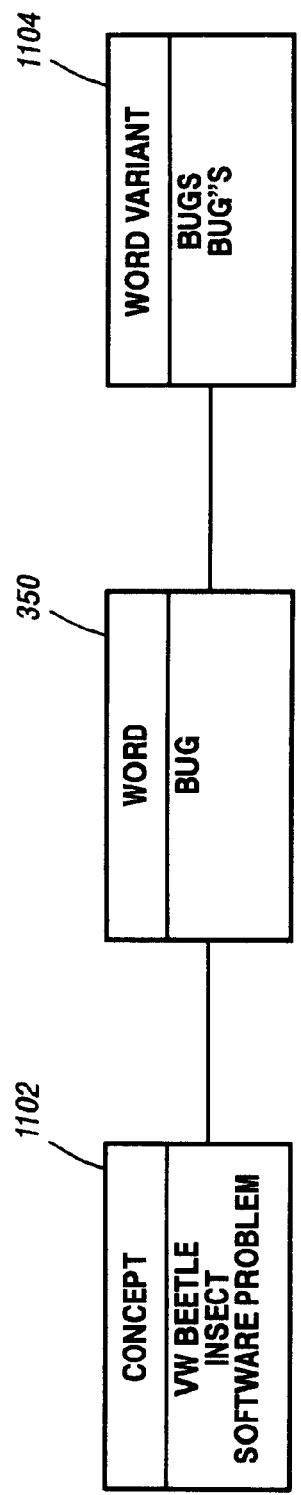
FIG. 11A is an illustration of a Relationships View provided for Word Element containing the concept "Bug"

FIG. 11A is an illustration of a Relationships View provided for Word Element containing the concept "Bug" 350 of FIG. 3. The selected element appears in the middle of a screen with an indication of the element type, "Word", listed at the top of the element representation. This element is shown having a relationship with the three Concept Elements listed in Block 1102, which are "VW Beetle", "Insect", and "Software Problem", and which correspond with elements 316, 326, and 328, respectively of FIG. 3. Element 350 is further shown having a relationship with the two Word Variant Elements listed in Block 1104. The listed Word Variant Elements correspond to elements shown in Boxes 342, and 344, respectively, of FIG. 3.

Another view provided by Element Viewers 122 is the Affinity View which provides a more distant view of a chain of related elements. The Affinity View takes as input a user-provided starting element or element type and an ending element or element type, and displays the starting element, the ending element, and all elements and element relationships which provide the chain, or "slice" of interconnections leading from the starting element to the ending element. A similar view is provided between a specified starting element type and a specified ending element type.

Figure 11B:
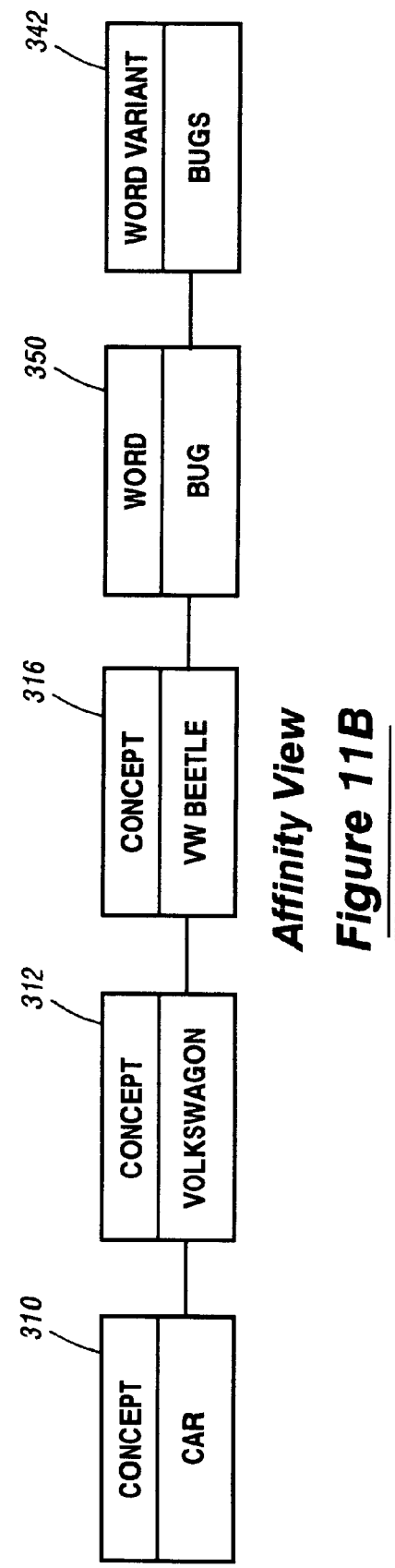
FIG. 11B is an example of an Affinity View starting with the Concept Element associated with concept "Cars", and ending with the Word Variant Element storing the string "Bugs"

FIG. 11B is an example of an Affinity View starting with Concept Element 310 associated with concept "Car", and ending with Word Variant Element 342 storing the string "Bugs". The chain of elements shows all levels of categorization existing between the specified starting and ending elements. Any number of levels of hierarchy can be represented.

From within either of the views shown in FIGS. 11A or 11B, the user is allowed to select an element for modification. This is accomplished by first selecting an element as the current element, then selecting the "modify function" from the user interface. In the preferred embodiment, the selection of a modify function when the currently-selected element is a Locator Element results in the invocation of a Locator Element Editor 123 shown in FIG. 1.

FIG. 12 is an illustration of a display provided by the Locator Element Editor 123. This example shows a display that would be provided if the user selected the Concept Element "Car" as the current concept. Window 1202 shows the concept tree for the selected concept. The concept tree is shown expanded up to the first Application Domain Element encountered, which stores the string "Motor Vehicles". This example assumes that no intervening levels of Concept Elements exist in the hierarchy between the Application Domain Element and the Concept Element storing the concept "Car". This example further assumes that the Concept Element "VW Van" is related to the Application Domain Element "Motor Vehicles."

As shown in this example, in the preferred embodiment, the entire Application Domain is expanded upon the initial user request. However, one skilled in the art will recognized that varying degrees of expansion could be provided in response to the initial user request to view a selected Concept Element within the concept tree, as may be dictated by system performance requirements, and available processing and memory resources.

Window 1204 shows a list of Words associated with the Concepts in the left-hand column, followed by a list of any Word Variant Elements for the Word Element. The user is allowed to highlight any one of the Concepts, Words, or Word Variants from either Window 1202 or 1204, then modify the character string stored in the Concept, Word, or Word Variant Element. Alternatively, the user may highlight a Concept and move it elsewhere in the concept tree within Window 1202. When a Concept Element is moved, all Word and Word Variant Elements related to that Concept Element are also moved in Window 1204. That is, the relationships between the Concept Element and any Word Elements remain unchanged, even though the relationships between the Concept Element and other Concept Elements are modified. In a similar manner, the user is allowed to highlight a Word or Word Variant Element in Window 1204 and position it adjacent to a new Concept Element. When any modifications are made to the elements of Windows 1202 or 1204, the concept tree as it originally existed, along with the associated Word and Word Variant elements, are displayed in Windows 1206 and 1208, respectively. This provides an easy way to track modifications.

The user is further allowed to add new Concept, Word, or Word Variant Elements. For Concept Elements, this is done by simply positioning the cursor at the desired location within Window 1202 in the concept tree, inserting a blank line, and typing the desired concept. A blank line will also appear in Window 1204 for the user to enter any Word or Word Variant Elements associated with the newly-entered Concept Element. Alternatively, the user may position the cursor within Window 1204 and enter additional Word or Word Variant Elements for an existing Concept Element.

When a user enters a new Word Element, related Word Variant Elements are automatically created to store automatically-generated character string variants for the newly-created string stored in the Word Element. These strings will be generated based on the word type indicated by the user for the created Word Element. For example, if the newly-create string is specified as a noun by the user, related Word Variant Elements storing the plural and possessive formats for the character string will automatically be created and stored in Element Inventory 102.

A user may delete elements by highlighting a particular element in either Window 1202 or 1204 and hitting the "delete" key.

When all changes have been entered, the user invokes an "Enter" command shown implemented by Key 1210 that causes the desired changes to be accepted. This causes Locator Element Editor to invoke various ones of the AIM EXE services in a manner to be discussed below to accomplish the element modifications, and to create any newly-specified elements.

As discussed above, in the preferred embodiment, the concepts, words, and word variants stored by an element are stored as a character string, and therefore modifications to the elements involve modification to this string data. Other types of data could be used, however, to represent concepts and words, as will be recognized by one skilled in the art. Additionally, in the preferred embodiment, relationships are implemented using pointers that point to related storage structures that are the related elements. Thus, in the preferred embodiment, relationships are changed by changing pointer data stored in the currently selected element, and further changing the pointer data stored in the elements that were related to the selected element, and the pointer data stored in the elements that are newly-related to the selected element. Of course, one skilled in the art will recognize that other ways are available for representing the relationships. For example, relationships may be represented by storing the unique element name indicators for the other elements related to a given element. Changes to the relationships would then be implemented by changing this element name information.

Locator Element Editor 123 further provides a means for a user to view the entire concept hierarchy. For example, the user may specify a particular Application Domain, and the entire concept tree for that application domain will be display. The user is allowed to scroll through the screens and see the various concept relationships, and any associated words and word variants defined for those concepts.

The above discussion describes Locator Element Editor 123 as being invoked via Element Viewers 122 when a "modify" function is specified when a Locator Element is the currently-selected element. Locator Element Editor 123 may also be invoked independently of Element Viewers 122 via the Interactive Tools 132 interface in a manner known in the art. Upon entry into the tool, the user is allowed to specify a Concept Element or an Application Domain Element of interest, and a display similar to that discussed above is provided, along with the capability to perform the functions described above.

Figure 13:
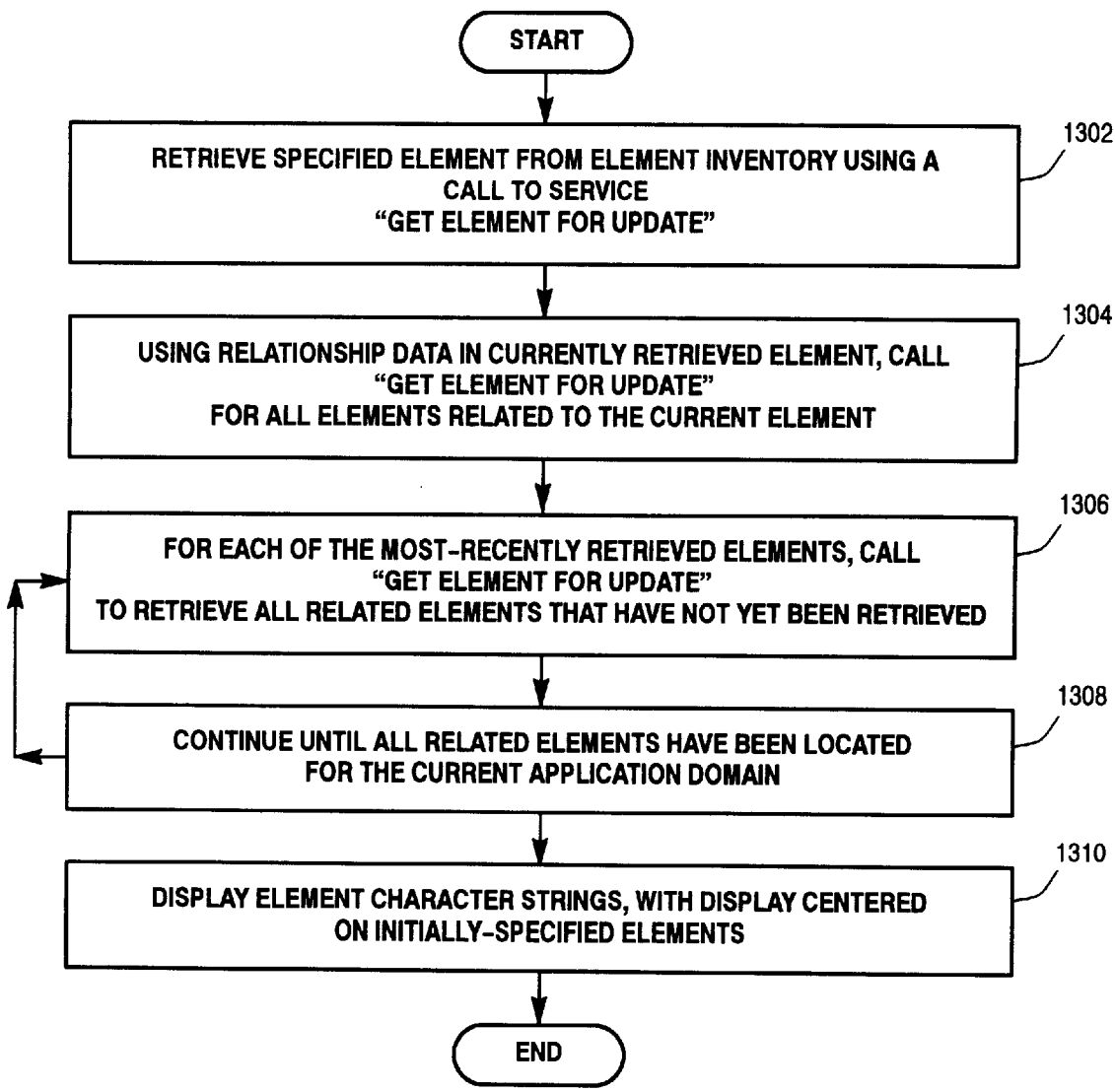
FIG. 13 is a flowchart of the method used by the Locator Element Editor to retrieve an initially-specified element and all elements in the same Application Domain.

FIG. 13 is a flowchart of the method used by the Locator Element Editor to retrieve an initially-specified element and all elements in the same Application Domain. In Step 1302, a call is made to the AIM EXE service "Get Element For Update" to retrieve the initially-specified element. In Step 1304, calls are made to "Get Element For Update" to retrieve all elements related to the initially-specified element using the relationship data from the initially-specified element. In Step 1306, the most-recently retrieved list of elements is processed using calls to "Get Element For Update" to retrieve all related elements. This process of retrieving the elements from Element Inventory continues until all related elements are retrieved for the Application Domain, as shown in Step 1308. The retrieved element storage structures are stored in a local memory buffer in Memory 126. This results in the entire Application Domain being available for modification. According to other embodiments, only some of the concept tree structure related to the specified element are initially retrieved. The list of element is displayed for the user in the format discussed above, with the display centered on the elements of interest, as shown in Step 1310.

Figure 14:
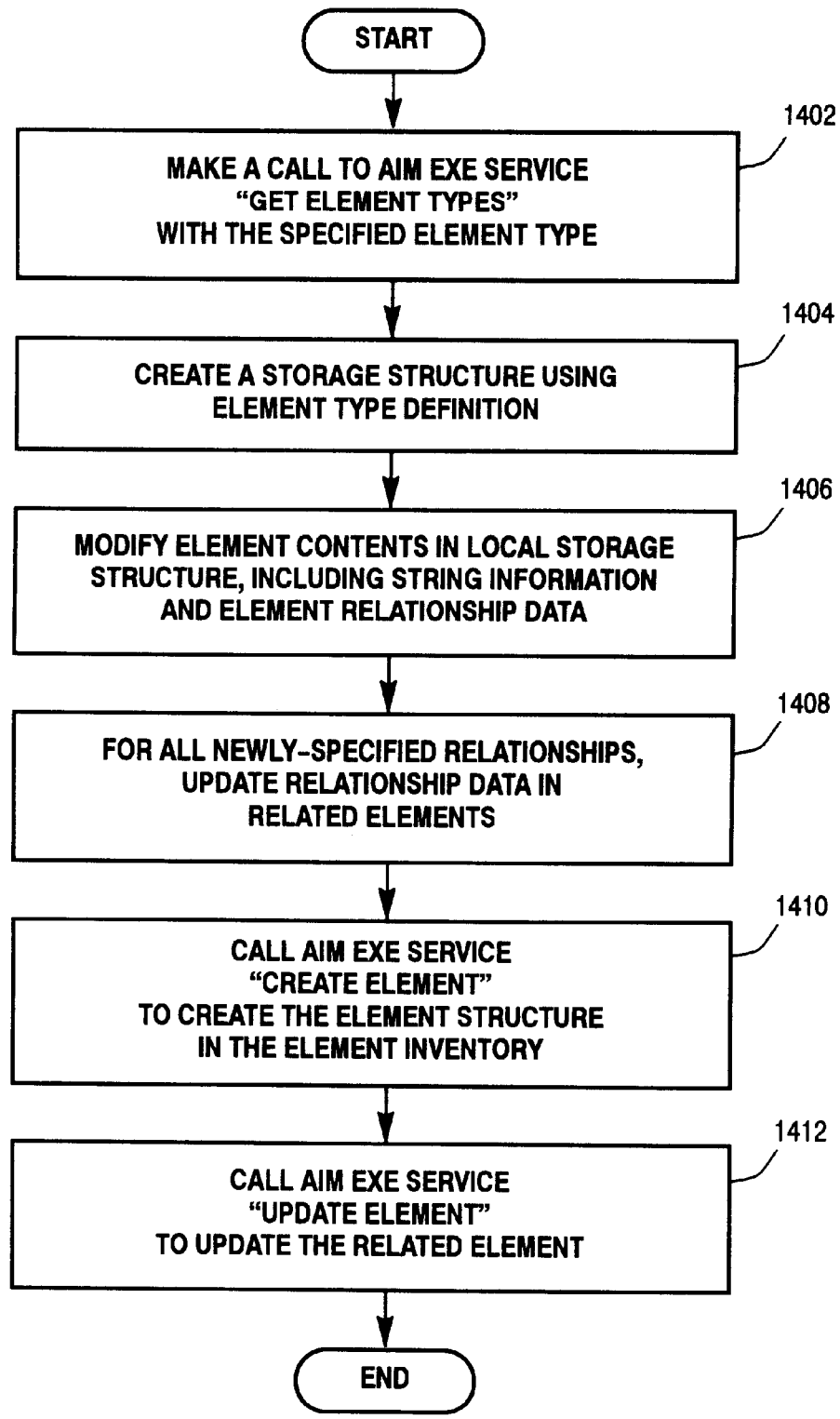
FIG. 14 is a flowchart of the method used to create a new element as specified by the user of Locator Element Editor.

FIG. 14 is a flowchart of the method used to create a new element as specified by the user of Locator Element Editor 123. The Locator Element Editor makes a call to the AIM EXE 105 service "Get Element Types" with the element type specified for the element which is to be created, as shown in Step 1402. The element type will be inferred based on the Window and location used to specify the element. For example, if a newly-created element is requested in Window 1202, the element type "Concept Element" is assumed. The called AIM EXE service retrieves the type definition from the EIS 103 and provides it to the Locator Element Editor. A template of a storage structure for the desired element type is created based on the element type definition, as shown in Step 1404. It may be noted that if multiple elements of the same type are to be created, element type retrieval need only be performed once.

Locator Element Editor next stores the user-provided modifications in the new element. This may include modifications to string and/or relationship data. This is shown in Step 1406. Next, relationship information is updated in all related local element storage structures, as depicted in Step 1408. The elements to be related to the current element are inferred based on the location of the newly-created element in the list displayed in either Window 1402 or Window 1404. The newly-created element is written to Element Inventory 102 using a call to service "Create Element", as shown in Step 1410. The modified elements are written to Element Inventory 102 using an "Update Element" service call, as illustrated in Step 1412.

Figure 15:
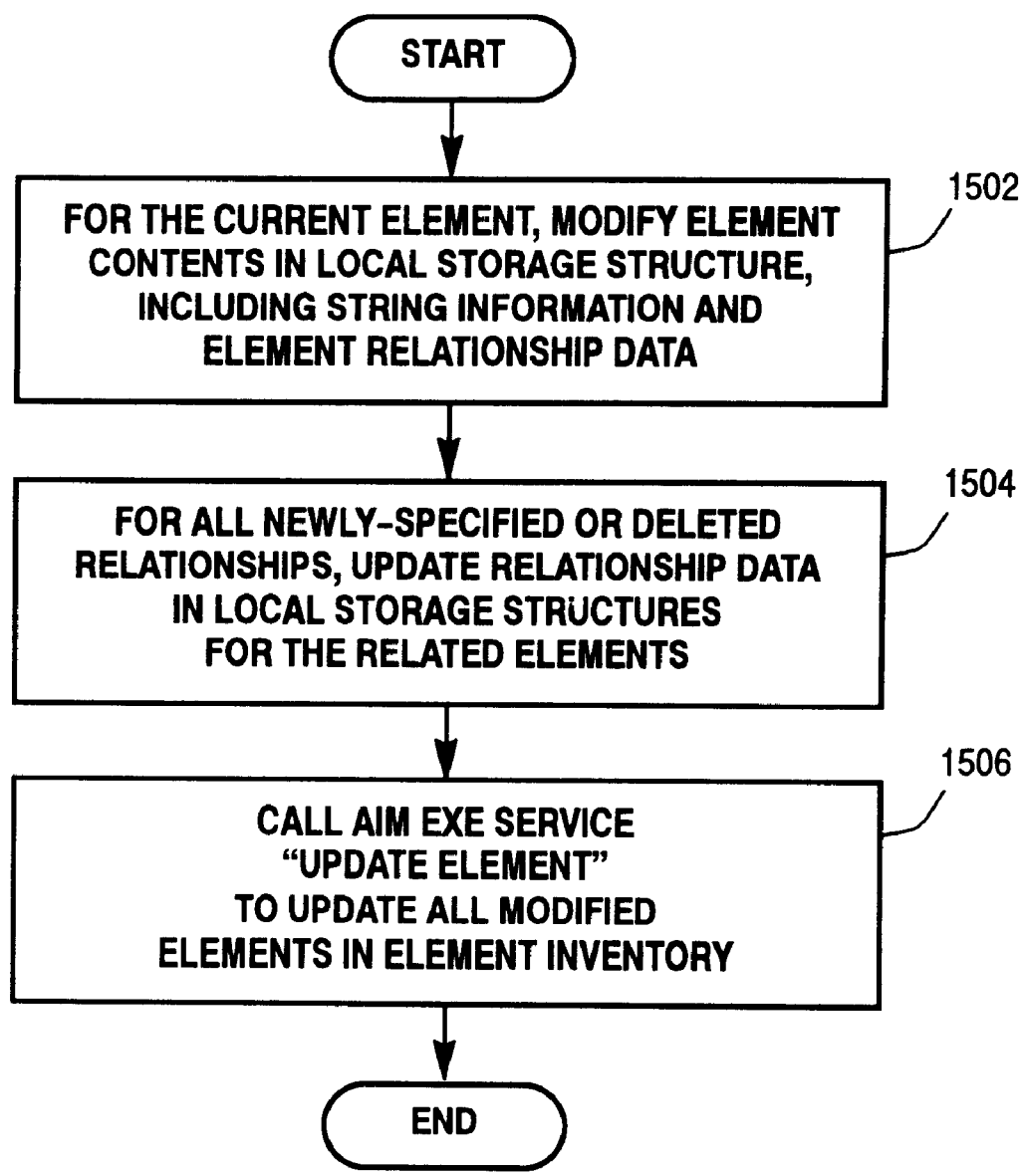
FIG. 15 is a flowchart of the method used to modify an existing element as specified by the user of Locator Element Editor.

FIG. 15 is a flowchart of the method used to modify an existing element as specified by the user of Locator Element Editor 123. The local storage structure is updated with new string information and/or relationship data, as shown in Step 1502. The relationship data is inferred from the positioning of the element in the displayed element list, as is discussed above in reference to FIG. 14. For all newly-specified or deleted relationships, the relationship data is the related elements is also updated, as shown in Step 1504. Then an "Update Element" service call is made to write the updated elements to the Element Inventory 102, as shown in Step 1506.

In one embodiment of the current invention, the above-described functions related to creating and modifying elements are based on user privilege levels as related to particular application domains. This allows system administrators to determine which users are allowed to make modifications to the Element Inventory 102, and further provides control over which portions of the Application Domain are modified. This protection is provided by only allowing designated users to execute the "Get Element For Update" function shown in FIG. 13, and by further verifying that the Application Domain element associated with the user-specified element is one of the Application Domains that may be processed for that user.

Having described an exemplary embodiment of the invention in the drawings and accompanying description, those skilled in the art will recognize that various modifications to the exemplary embodiment could be made without departing from the scope and spirit of the claims set forth below:

What is claimed is:

1. An interactive search development system for use by a user in developing a query string, comprising:

storage means for storing individually-addressable elements, each of said elements storing string signals indicative of a character string which may or may not signify relationships, each of said elements storing relationship indicators indicative of one or more relationships, each of said relationships existing between said each of said elements and a different respective one of said elements, wherein each of said elements exists as a node within a hierarchical tree structure having multiple hierarchical levels, and each of said relationships exists as a branch of said hierarchical tree structure;

search string means coupled to said storage means, said search string means for locating in said storage means a selected one of said elements, for starting at said selected one of said elements and traversing relationships in said hierarchical tree structure until a predetermined number of hierarchical levels in said hierarchical tree structure, as determined by the user, have been traversed; and user interface means coupled to said search string means for providing a list of ones of said elements located during said traversing of relationships, and for allowing the user to select or de-select each located element for use in developing the query string and wherein a said developed query string may include relationship words as sub strings and wherein said relationship words may also be de-selected from said query string by said user.

2. The interactive search development system of claim 1, wherein said search string means includes interactive mode means for causing said user interface means to provide to the user, following traversal of each of said predetermined number of hierarchical levels in said hierarchical tree structure, a list of said elements located, and whereby the user is allowed to de-select any of said elements located for use in developing a query string, whereby de-selection of said any of said elements located disqualifies for traversal all relationships existing between each de-selected one of said elements located and other ones of said elements.

3. The interactive search development system of claim 1, wherein said search string means includes parent locator means for allowing the user to indicate a selectable number of said multiple hierarchical levels within said hierarchical tree structure that said search string means is to traverse above the level at which said selected one of said elements resides.

4. The interactive search development system of claim 1, wherein said search string means includes child locator means for allowing the user to indicate a selectable number of said multiple hierarchical levels within said hierarchical tree structure that said search string means is to traverse below the level at which said selected one of said elements resides.

5. The interactive search development system of claim 1, wherein said search string means includes sibling locator means for allowing the user to indicate whether ones of said elements that are sibling elements of said selected one of said elements are to be located by said search string means.

6. The interactive search development system of claim 1, wherein said user interface means includes search expansion means for allowing a user to select predetermined relationships existing between selected ones of said elements in said list and other related ones of said elements, whereby selected ones of said predetermined relationships are traversed by said search string means to locate said other related ones of said elements, and whereby said other related ones of said elements are added to said list.

7. The interactive search development system of claim 6, wherein said search expansion means includes means for specifying said predetermined relationships as parent relationships, wherein said parent relationships are those between said selected ones of said elements in said list and ones of said elements one level higher in said hierarchical tree structure.

8. The interactive search development system of claim 6, wherein said search expansion means includes means for specifying said predetermined relationships as child relationships, wherein said child relationships are those between said selected ones of said elements in said list and ones of said elements one level lower in said hierarchical tree structure.

9. The interactive search development system of claim 1, wherein said user interface means includes search expansion means for allowing a user to select ones of said elements in said list, and whereby said selection causes said locator means to add sibling elements of said selected ones of said elements in said list to said list.

10. The interactive search development system of claim 1, wherein said search string means includes search string editor means for allowing a user to format into a query string said string signals stored by predetermined ones of said elements included in said list.

11. The interactive search development system of claim 10, wherein said search string editor means further includes logical operator means for adding logical operators to said query string.

12. The interactive search development system of claim 1, and further including element editor means coupled to said storage means for modifying, within any selected ones of said elements, said string signals.

13. The interactive search development system of claim 12, wherein said element editor means includes means for modifying, within any selected one of said elements, said relationship indicators to modify one or more relationships existing between said any selected one of said elements and other ones of said elements.

14. The interactive search development system of claim 12, wherein said element editor means includes element creation means for creating new ones of said elements, for storing ones of said string signals in said new ones of said elements, and for creating ones of said relationship indicators indicative of one or more new ones of said relationships, each of said one or more new ones of said relationships existing between a respective one of said new ones of said elements and a different respective one of said elements.

15. The interactive search development system of claim 1, wherein said user interface means includes search input means for allowing the user to input a first element for inclusion in the query string.

16. For use in a object management system having a memory to store elements, each of the elements including concept signals indicative of a respective search concept, each of the elements storing relationship signals indicative of one or more respective relationships, wherein each of the one or more respective relationships exists between said each of the elements and a respective other one of the elements, the system further having a user interface for allowing a user to interactively develop a query string, the method of developing a query string, comprising the steps of:

(a) searching each of the elements to locate an element storing a selected search concept and adding the located element to a set of located elements;

(b) traversing selected ones of the one or more relationships between said located element to locate one or more other ones of the elements and adding said one or more other ones of the elements to said set of located elements, wherein said traversing and adding step further includes the steps of:

(b1) making said one or more other ones of the located elements located in said step (b) the current set of elements comprising the steps of:

displaying via the user interface each of the elements in said set of located elements; and allowing the user to selectably remove any of the elements from said set of located elements, whereby removed elements are ineligible for use in building the query string and ineligible for use in this traversing and adding step (b), and wherein said relationship words may also be included among said removed elements;

(b2) performing said step (b) for each of the elements in said current set of elements; and (b3) repeating steps (b1) and (b2) a selected number of times; and (c) building a query string without syntax, including the concept signals stored in predetermined ones of said located elements included in said set of located elements, and wherein said query string so built may include among said predetermined ones of said located elements, relationship words as sub strings of said query string.

17. The method of claim 16, wherein step (b1) further includes the steps of:

displaying via the user interface each of the elements in said set of located elements;

allowing the user to specify, for a selected element is said set of located elements, a selected relationship existing between said selected element and another one of the elements;

traversing said selected relationship to locate said another one of the elements; and adding said another one of the elements to said set of selected elements.

18. The method of claim 16, wherein the one or more respective relationships for each of the elements each forms a branch in a hierarchical tree structure having multiple levels, and wherein said selected ones of the one or more relationships in said step (b) may selectably include relationships interconnecting said located element and other elements residing a selected number of levels above said located element in said hierarchical tree structure.

19. The method of claim 16, wherein the one or more respective relationships for each of the elements each forms a branch in a hierarchical tree structure having multiple levels, and wherein said selected ones of the one or more relationships in said step (b) may selectably include relationships interconnecting said located element and other elements residing a selected number of levels below said located element in said hierarchical tree structure.

20. The method of claim 16, wherein the one or more respective relationships for each the elements each forms a branch in a hierarchical tree structure, and wherein said selected ones of the one or more relationships in said step (b) may selectably include those relationships between said located element and another element existing at the same level in said hierarchical tree structure wherein said located element and said another element each have a relationship to a same element existing one level above said located element in said hierarchical tree structure.

21. The method of claim 16, wherein step (c) further includes the step of selectably adding logical operators between selected ones of said concept signals included in the query string.

22. The method of claim 16, and further including the step of providing said query string to a search tool for use in performing a search.

23. The method of claim 22, wherein step (c) includes the step of using rules to format said query string according to a format required by said search tool.

24. The method of claim 16, and further including the step of allowing the user to modify ones of the concept signals stored in selected ones of the elements.

25. The method of claim 16, and further including the step of allowing the user to modify ones of the relationship signals in selected ones of the elements to thereby modify one or more respective relationships existing between each of said selected ones of the elements and one or more respective other ones of the elements.

26. The method of claim 16 further comprising prior to step "(a)", permitting user input of a search string word and determining if the search string word corresponds to any one of the elements, then permitting the user to select at least that element for said query string.

27. An interactive search development system for use by a user in developing a query string, comprising:

storage means for storing individually-addressable objects, ones of said objects being concept elements each for storing concept signals indicative of a respective search concept, and other ones of said objects being word elements, each storing word signals indicative of a character string, wherein said character string may or may not signify relationships, each of said word elements storing relationship signals indicative of a relationship with at least one of said concept elements, wherein said at least one of said concept elements stores concept signals indicative of a respective search concept related to said character string stored by said each of said word elements;

search string means coupled to said storage means, said search string means for receiving a user-provided character string from the user, for searching said storage means for a specified one of said word elements storing word signals indicative of a said user-provided character string, for locating as related concept elements said at least one of said concept elements related to said specified one of said word elements, for further locating all other ones of said word elements related to located ones of said concept elements; and user interface means coupled to said search string means for allowing the user to select or de-select each of said located ones of said concept elements wherein said query string may include as ones of said concept elements, selectable and de-selectable concept elements which may be relationship words and each located one of said word elements for use in developing the query string wherein said query string may include relationship words as sub strings.

28. The interactive search development system of claim 27, and further including element editor means coupled to said storage means for allowing the user to selectively modify ones of said concept signals, ones of said word signals, and ones of said relationship signals.

29. The interactive search development system of claim 28, wherein said element editor means includes element creation means for allowing the user to selectively add ones of said concept elements and ones of said word elements, and for allowing the user to create ones of said relationship signals indicative of a relationship between an added one of said concept elements or an added one of said word elements and another respective one of said elements.

30. The interactive search development system of claim 29, wherein said element creation means includes means for automatically generating additional ones of said word elements storing character strings that are variants of the character strings stored by a respective added one of said word elements, and wherein each of said additional ones of said word elements store ones of said relationship signals indicative of a relationship with said respective added one of said word elements.

31. The interactive search development system of claim 27, wherein said storage means further includes means for storing, for each of said concept elements, concept relationship signals for relating each of said concepts elements to at least one other respective one of said concept elements, whereby said concept elements are arranged into a multi-level hierarchical concept tree structure.

32. The interactive search development system of claim 31, wherein said search string means further includes concept traversal means for traversing a selectable number of levels in said multi-level hierarchical concept tree structure, starting at said related concept elements, and whereby additional ones of said concept elements are located, said concept traversal means further for locating additional ones of said word elements related to said additional ones of said concept elements, and wherein said additional ones of said word elements may be selected by the user for inclusion in the query string.

33. The interactive search development system of claim 32, wherein said user interface means includes means for allowing the user to select or de-select each located one of said concept elements following traversal of each level in said multi-level hierarchical concept tree structure.

34. The interactive search development system of claim 32, wherein said concept traversal means includes child level selection means for allowing the user to specify a selectable number of levels below said related concept elements that are to be traversed in said multi-level hierarchical concept tree structure.

35. The interactive search development system of claim 32, wherein said concept traversal means includes parent level selection means for allowing the user to specie a selectable number of levels above said related concept elements that are to be traversed in said multi-level hierarchical concept tree structure.

36. The interactive search development system of claim 27, wherein said user interface means includes search expansion means for allowing the user to specify predetermined relationships existing between any said located one of said concept elements for traversal, whereby additional ones of said concept elements may be located, and wherein any ones of said word elements related to said additional ones of said concept elements may be selected by the user for inclusion in the query string.

37. The interactive search development system of claim 27, wherein said user interface means includes search input means for allowing the user to input a first element for inclusion in the query string.

* * * * *